(12) United States Patent
Colborne et al.

(10) Patent No.: US 7,133,480 B2
(45) Date of Patent: Nov. 7, 2006

(54) METHOD AND APPARATUS FOR PROCESSING DIGITALLY SAMPLED SIGNALS AT A RESOLUTION FINER THAN THAT OF A SAMPLING CLOCK

(75) Inventors: Steven Francis Colborne, Long Beach, CA (US); Richard Gerald Keegan, Palos Verdes Estates, CA (US)

(73) Assignee: Leica Geosystems Inc., Norcross, GA (US)

( * ) Notice: Subject to any disclaimer, the term of this patent is extended or adjusted under 35 U.S.C. 154(b) by 945 days.

(21) Appl. No.: 09/802,841

(22) Filed: Mar. 9, 2001

(65) Prior Publication Data
US 2002/0141522 A1 Oct. 3, 2002

(51) Int. Cl.
*H04L 7/00* (2006.01)
(52) U.S. Cl. ............... 375/355; 375/362; 375/316; 342/357.06; 342/357.12; 701/213
(58) Field of Classification Search ........... 375/316, 375/355, 362, 371, 130; 327/141; 342/357.12, 342/357.06; 701/213
See application file for complete search history.

(56) References Cited

U.S. PATENT DOCUMENTS

| | | | |
|---|---|---|---|
| 5,574,756 A * | 11/1996 | Jeong | 375/376 |
| 6,603,362 B1 * | 8/2003 | Von Dolteren, Jr. | 331/25 |
| 2002/0075969 A1 * | 6/2002 | Sande et al. | 375/292 |
| 2002/0084856 A1 * | 7/2002 | Von Dolteren, Jr. | 331/1 A |

\* cited by examiner

*Primary Examiner*—Jean B. Corrielus
(74) *Attorney, Agent, or Firm*—Birch, Stewart, Kolasch & Birch, LLP

(57) ABSTRACT

A method and related apparatus for reproducing a periodic signal received over a communication channel, or signal window of a desired profile, wherein the resolution of the reproduced signal or window is not limited by a digital sampling interval. The profile can be selected to match and compensate for known or estimated characteristics of a communication channel. A frequency difference, due to a Doppler frequency shift or other errors between received signals and locally generated signals, is determined in a receiver and utilized to derive a fine code phase measurement that is then usable to generate a succession of magnitudes that reproduce the desired signal or window profile.

26 Claims, 14 Drawing Sheets

METHOD AND APPARATUS FOR PROCESSING DIGITALLY SAMPLED SIGNALS AT A RESOLUTION FINER THAN THAT OF A SAMPLING CLOCK

BACKGROUND OF THE INVENTION

This invention relates generally to techniques for reproducing a signal or event by using discrete digital samples and, more particularly, to techniques for reproducing periodic signals or events in the processing of global positioning system (GPS) signals. Although the present invention has application in areas other than GPS signal processing, the GPS environment provides a useful context for describing the invention and its background.

As is well known, a GPS receiver can accurately determine its position in three dimensional space, based on radio-frequency (RF) signals received simultaneously from multiple earth-orbiting satellites. There is a sufficient number of satellites in orbit to allow more than one (and preferably at least four) to be visible to a receiver at any point on or above the earth. The signals transmitted from each satellite uniquely identify the satellite and also include ephemeris data that define the satellite orbit. From a measurement of the time for transmission of a code signal from each satellite to the receiver, an apparent distance or range to each satellite is calculated in the receiver. If these range values were accurate, the receiver could compute its three-dimensional position from three satellite positions and ranges. Because a receiver clock cannot be exactly synchronized with clocks on the satellites, there is, however, an inherent time error in the distance measurements, which are referred to as pseudoranges. Thus there are four unknown quantities: the three location dimensions and the unknown time error between satellites and the receiver. (The satellites themselves are maintained in precise synchronism by control from ground stations.) Therefore, so long as there are at least four satellites in view the time error can be eliminated and the receiver position accurately determined.

The satellite signals include a pseudorandom digital code sequence, which varies in an apparently random pattern that repeats itself over time. Each satellite is uniquely identifiable from its code sequence. One function of the receiver is to generate a replica of this pseudorandom code and to synchronize the locally generated code signals with the incoming code signals, in a process usually referred to as code tracking. GPS code signals may be viewed as a sequence of periodic events in the form of state changes of a digital signal level. For purposes of discussion, it will be helpful to consider just one state change in the code as being a periodic event of interest. It is usually desired, as in a GPS receiver, to reproduce this signal state change event as accurately as possible, in terms of the time of the change. Both the satellite generating the signal event to be reproduced and the receiver attempting to effect the reproduction generate the event to coincide with the timing of a digital clock period. Although, both the satellite and the receiver may use digital clocks that are nominally synchronous in terms of frequency, they will not be perfectly synchronous, for two reasons. First, the receiver clock will in general not be as accurate as the satellite clock and there will inevitably be a slight frequency difference between the two clocks. Second, because the satellite is in motion relative to the receiver, signals received from the satellite will be shifted in frequency by the Doppler effect as the satellite approaches and then recedes from the position of the receiver.

Because of this unavoidable asynchronous relationship between sample clocks on a satellite and on the receiver, the event under consideration cannot be faithfully reproduced in the receiver. More specifically, the reproduced event may occur as much as almost a full sample interval earlier or later than the actual event. Depending on the difference between the local receiver clock and the satellite clock, the reproduced event will gradually "drift" in time with respect to the actual event, at a rate depending on the clock frequency difference and on the Doppler effect, which, of course, varies relatively slowly as the satellite passes over the receiver.

A similar problem arises if one wishes to reproduce a non-digital event, such as a periodic analog signal, using a signal generator that is limited by the use of a digital sampling technique. A signal transition not occurring at a sample point will be reproduced as occurring at the nearest preceding sample point. In effect, the reproduced signal will not only be skewed in time with respect to the original signal, but will also not be a faithful representation of the signal magnitude, even at the sample points.

In processing GPS and other types of signals, it is sometimes desired to sample a signal waveform within a predetermined time window. For example, in GPS receivers, performance in a multipath signal environment is enhanced by sampling within a prescribed multipath mitigation window. See, for example, U.S. Pat. No. 6,023,489 issued to Ronald R. Hatch, and U.S. Pat. No. 5,963,582 issued to Thomas A. Stansell, Jr. There is, however, an inherent difficulty in sampling across a desired window if the starting and ending points of the window do not coincide with available digital sample points. The desired window and the reproduced window may be the same integral number of sample intervals in width, but the reproduced window may be offset in time from the desired position because of the necessarily asynchronous relationship between receiver and satellite clocks. Because the reproduced window will "slide" in time with respect to the desired window, integration over time may still produce close to the desired windowing effect, but better performance would be obtained if the reproduced window more accurately matched the desired window at each occurrence.

The multipath mitigation windows described in the patents referenced above are limited in shape. The window width is limited to the sampling interval, or multiples the sampling interval, and the window height is limited to a fixed height or some simple multiples or sub-multiples of the fixed height. One underlying assumption of prior techniques for reproducing digital signal events is that digital signals change instantaneously from one level to another, such as from +1 to 0 or −1. Although a digital signal event may be close to this ideal when transmitted, the same signal event as received will be necessarily distorted in profile because any practical transmission channel is limited in bandwidth and cannot, therefore, faithfully transmit instantaneous changes in signal level. Ideally, detection of signal event received through a limited-bandwidth channel should make use of a signal window that has a profile designed with the effect of the channel taken into account. GPS receivers prior to the present invention have not had this capability.

It would be extremely advantageous in GPS receiver design, as well as in other signal processing systems, to be able to reproduce a desired digital or analog signal event, or a signal sampling window, with a higher temporal resolution than digital sampling usually allows. Ideally, the reproduced signal event or window should have a desired waveform or profile without being constrained to particular fixed magnitudes and without being constrained by the digital sampling interval. The present invention is directed to this end.

BRIEF SUMMARY OF THE INVENTION

The present invention resides in a method and related apparatus for reproducing a desired signal waveform or window waveform at a resolution higher than that provided by a digital sampling interval. Briefly, and in general terms, the method of the invention comprises the steps of demodulating received signals in a receiver, to derive a periodic code signal; generating in the receiver a local clock signal used to provide signal sampling pulses separated by sampling intervals; determining a frequency difference between the local clock signal and the received signals; adjusting the local clock signal to compensate for the frequency difference; deriving from the frequency difference a code phase value that provides a measure of a sub-sample code phase difference between the sampling pulses and the received code signals; and using the sub-sample code phase difference to reproduce a desired signal that is precisely synchronized with the received code signals.

More specifically, the step of using the sub-sample code phase difference includes determining a signal magnitude for each of a succession of time values as determined from the occurrence of sampling pulses and the sub-sample code phase difference values; and outputting a succession of magnitudes to provide the desired signal profile. If the desired signal defines a weighted time window, the method may also include the step of applying the weighted time window to the received signals, to detect a signal event expected to occur within the weighted time window. The time window may be designed for any specific purpose, such as to optimize signal event detection for a particular communication channel through which the signals are received.

The method of the invention may also be defined as a method for reproducing a desired signal in synchronism with a signal event in a received signal, the method comprising the steps of generating sample clock signals spaced at sample intervals; generating sub-sample clock signals; deriving from the sub-sample clock signals a measure of clock phase within each sample interval; and generating the desired signal synchronized with a received signal event to an accuracy limited only by the sub-sample clock signals. The sample clock signals occur at a sampling clock rate that is nominally an integral multiple of the rate at which signal events may occur in the received periodic signal, but which cannot be exactly synchronized with the received periodic signal because of a frequency difference between the received signals and locally generated signals. Use of the sub-sample clock signals allow generation of the desired signal to a higher level of temporal accuracy. The step of generating the desired signal may also include generating a succession of signal magnitudes at times determined by the sub-sample clock signals, to provide a desired signal profile.

In one disclosed embodiment of the invention, the step of deriving a measure of clock phase includes applying the sub-sample clock signals to a counter; resetting the counter with the sample clock signals; and using the counter value as the measure of clock phase. Other techniques for generating sub-sample clock signals or deriving a code phase value are also within the scope of the invention.

The present invention may also be defined as a method for generating a weighted signal window of a desired profile in a GPS receiver that digitally samples received periodic signals. In this embodiment, the method comprises the conventional steps of demodulating received signals in a GPS receiver, to derive a periodic GPS code sequence; generating in the receiver a local clock signal used to provide signal sampling pulses separated by sampling intervals and to generate other timing signals; generating in the receiver a local periodic GPS code sequence similar to the one received, at a code rate determined in part by the local clock signal and nominally the same as the received code rate; determining in the receiver a frequency difference between the received GPS code rate and the locally generated GPS code rate; and applying the frequency difference to the locally generated GPS code rate to provide an adjusted locally generated GPS code rate. The method also includes the steps of deriving from the frequency difference a code phase value indicative of the code phase within a code rate period; and using the code phase value to generate a weighted signal window that is synchronized with a desired signal event in the received GPS code sequence.

In a disclosed embodiment of the invention, the step of applying the frequency difference to the locally generated GPS code includes dividing the frequency difference by a selected value, using a counter to provide an output signal whenever the counter overflows, to indicate that the frequency difference has resulted in a cumulative phase error equivalent to a whole code rate period; and the step of deriving a code phase value includes multiplying the code rate period by the ratio of the current counter contents to a full counter value. The step of using the code phase value to generate a weighted signal window also preferably includes generating a succession of signal values of selected magnitudes, at times precisely determined from the code phase values, wherein the signal window is synchronized with a received signal event and has a desired profile. The desired window profile may be selected for any purpose, such as to mitigate multipath effects in the receiver, or for optimal detection of a signal pulse after the received signals have passed through a communication channel of limited bandwidth.

The invention may also be defined in terms of novel apparatus for use in a receiver that processes digitally sampled signals, and for reproducing a signal of a desired profile. The apparatus comprises a demodulator connected to receive signals in a receiver, and to derive a periodic code signal; a local clock signal generator used to provide signal sampling pulses separated by sampling intervals; a frequency differencing circuit, for determining a frequency difference between the local clock signals and the received signals; means for adjusting the local clock signal to compensate for the frequency difference; means for deriving from the frequency difference a code phase value that provides a measure of a sub-sample code phase difference between the sampling pulses and the received code signals; and a signal generator using the sub-sample code phase difference to reproduce a desired signal that is precisely synchronized with the received code signals. The signal generator using the sub-sample code phase difference may also include means for determining a signal magnitude for each of a succession of time values as determined from the occurrence of sampling pulses and the sub-sample code phase difference values; and means for outputting a succession of magnitudes to provide the desired signal profile. In one form of the apparatus, the desired signal defines a weighted time window; and the apparatus further comprises means for applying the weighted time window to the received signals, to detect a signal event expected to occur within the weighted time window. The time window may be weighted to achieve any desired goal, such as to optimize signal event detection for a particular communication channel through which the signals are received.

The apparatus of the invention may be defined more generally as comprising a sample clock signal generator, generating clock signals at sample intervals occurring at a sampling clock rate that is nominally an integral multiple of a rate at which signal events may occur in a received periodic signal, but which cannot be exactly synchronized with the received periodic signal; a sub-sample clock signal generator; means for deriving from the sub-sample clock signals a measure of clock phase within each sample interval; and means for generating the desired signal synchronized with the received signal event to an accuracy level limited only by the sub-sample clock signals. The means for generating the desired signal may include means for generating a succession of signal magnitudes at times determined by the sub-sample clock signals, to provide a desired signal profile. The means for deriving a measure of clock phase includes, in one disclosed embodiment of the invention, means for applying the sub-sample clock signals to a counter; means for resetting the counter with the sample clock signals; and means for using the counter value as the measure of clock phase.

In one preferred embodiment of the invention, the apparatus is used for generating a weighted signal window of a desired profile in a GPS receiver that digitally samples received periodic signals. This form of the apparatus comprises a number of conventional elements, including a demodulator, for demodulating received signals in a GPS receiver, to derive a periodic GPS code sequence; a local clock generator, for generating a local clock signal used to provide signal sampling pulses separated by sampling intervals and to provide other timing signals in the receiver; a local periodic GPS code generator, for generating in the receiver a local periodic GPS code sequence similar to the one received, at a code rate determined in part by the local clock signal and nominally the same as the received code rate; a circuit for determining a frequency difference between the received GPS code rate and the locally generated GPS code rate; and an adjustable divider circuit for applying the frequency difference to the locally generated GPS code rate, to provide an adjusted locally generated GPS code rate. In accordance with this aspect of the invention, the apparatus uses a counter circuit for deriving from the frequency difference a code phase value indicative of the code phase within a code rate period; and includes a signal window generator that uses the code phase value as a measure of time, and generates a weighted signal window that is synchronized with a desired signal event in the received GPS code sequence.

More specifically, the counter circuit for deriving a code phase value divides the frequency difference by a selected value and provides an output signal whenever the counter overflows, to indicate that the frequency difference has resulted in a cumulative phase error equivalent to a whole code rate period, wherein this output signal is coupled to the adjustable divider circuit; and the apparatus further comprises a code phase generation circuit, for multiplying the code rate period by the ratio of the current counter contents to a full counter value. The signal window generator may include means for generating a succession of signal values of selected magnitudes, at times precisely determined from the code phase values, wherein the signal window is easily synchronized with a received signal event and has a desired profile. The signal window generator provides a desired window profile selected to achieve a desired goal, such as to mitigate multipath effects, or for optimal detection of a signal pulse after the received signals have passed through a communication channel of limited bandwidth.

It will be appreciated from the foregoing summary that the present invention represents a significant advance in the field of GPS receivers and in digital signal processing generally. In particular, the invention allows the reproduction of a signal or window of a desired magnitude profile and to a higher level of accuracy than is usually provided by a digital sampling clock. Other aspects and advantages of the invention will become apparent from the following more detailed description, taken in conjunction with the accompanying drawings.

BRIEF DESCRIPTION OF THE SEVERAL
VIEWS OF THE DRAWINGS

FIGS. 1A–1D together are a series of waveforms showing representation of a digital periodic event using digital sampling.

FIGS. 2A–2D together are a series of waveforms showing representation of portion of an analog periodic signal using digital sampling.

FIGS. 3A–3D together are a series of waveforms showing generation of a signal window for sampling data in a periodic waveform using digital sampling.

FIGS. 4A–4D together are a series of waveforms showing generation of a signal window for sampling data in a periodic waveform using digital sampling in accordance with the present invention.

FIGS. 5A–5D together are a series of waveforms showing representation of a desired periodic signal using digital sampling in accordance with the invention.

DETAILED DESCRIPTION OF THE INVENTION

Figure 1A:
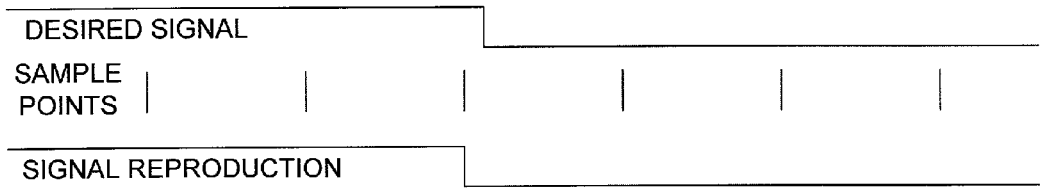

As shown in the drawings for purposes of illustration, the present invention pertains to a method and apparatus for reproducing a desired periodic signal event, such as a signal waveform or a desired signal time window, without being limited in temporal resolution by a digital sampling interval and without being limited to a small number of specific signal magnitudes. As briefly described above, the accuracy of reproduction of signal events and sampling windows is limited by the use of a digital sampling interval. This limitation will now be described further with reference to the drawings.

Figure 1B:
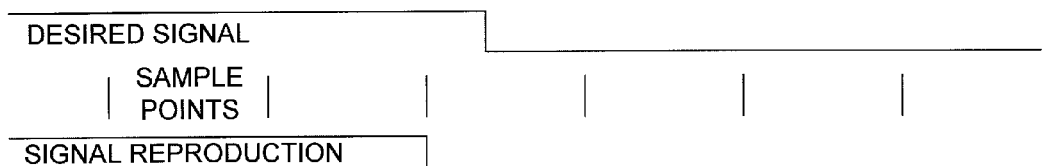
Figure 1C:
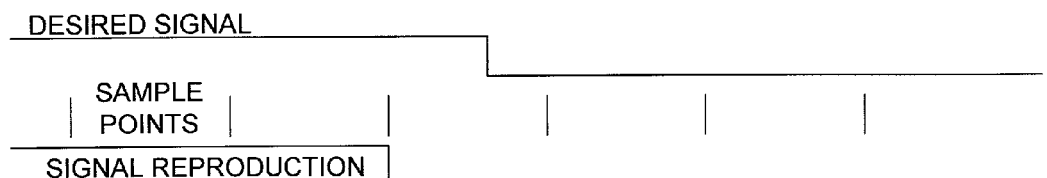
Figure 1D:
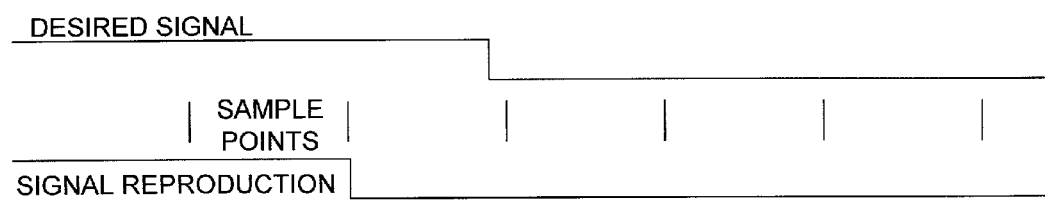

FIGS. 1A–1D depict how a periodic digital event may be represented or reproduced using digital sampling. In each of the figures, the upper waveform is the desired signal event to reproduce and the lower waveform is the reproduced signal. The event in this case is a digital transition from a high level to a lower level. In between the upper and lower waveforms, short vertical lines represent digital sample points. In FIG. 1A, a sample point occurs immediately before the signal transition or event, and is chosen as the transition time in the reproduced signal. Because of timing differences between the clocks in the signal reproduction system and in the source of the signal to be reproduced, the sample points will drift in time with respect to the signal event, which is based on time as measured in the signal source. Thus, as shown in FIGS. 1B, 1C and 1D, in reproducing successive instances of the periodic signal event the sample point immediately preceding the event occurs progressively earlier. Therefore, the transition in the reproduced signal is made to occur progressively earlier. The next view in the sequence would be the same as FIG. 1A, when the sample points had "slid" a complete sample time with respect to the event. Therefore, the reproduced signal event varies in temporal position by as much as one sample time interval from the true or desired position.

In the specific application of GPS signal processing, the drift in the temporal positions of sample points is caused by an unavoidable disparity between clock rates on a satellite as compared with the receiver. The disparity includes any real difference in clock rates, as well as a difference caused by the Doppler effect as the satellite moves with respect to the receiver.

Figure 2A:
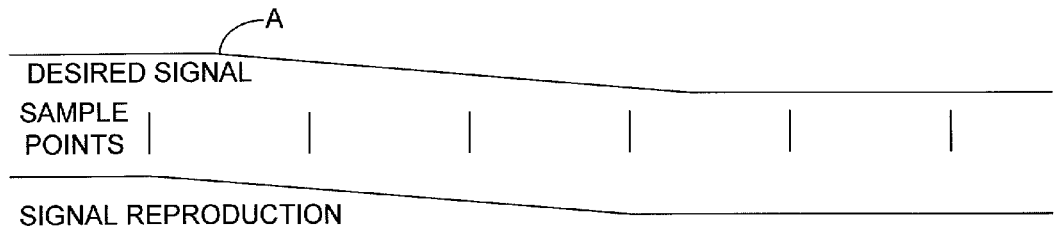
Figure 2B:
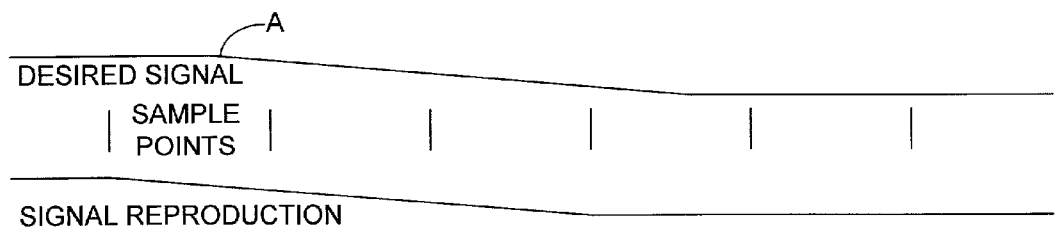
Figure 2C:
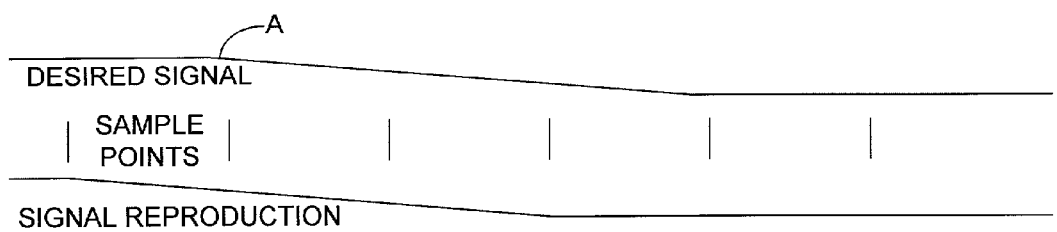
Figure 2D:
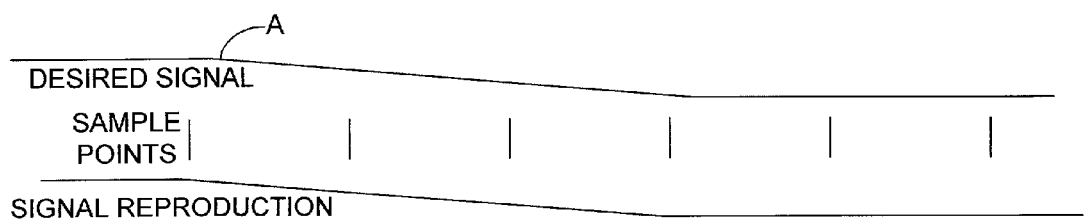

FIGS. 2A–2D illustrate a related problem in attempting to reproduce a periodic non-digital waveform with digital sampling. Again, the upper waveform in each figure is the desired signal to reproduce, the lower waveform is the reproduced signal, and sample points are shown by short vertical lines between the upper and lower waveforms. In FIG. 2A, a sample point occurs shortly before a "transition" in the signal waveform. Since the waveform in this example is analog in nature, it is constantly subject to "transition," so that the word is not completely accurate. For purposes of illustration, however, the signal is shown as being relatively flat and unvarying prior to point A, at which the curve begins a decreasing phase. In FIG. 2A, the sample immediately preceding point A is chosen to represent the transition at that point. Other transition points on the signal will be similarly located earlier in the reproduced signal waveform. Thus, the whole reproduced curve is offset in the "early" direction. Also, the magnitudes at the sample points do not necessarily reflect the correct signal levels and, because the signal is reproduced by discrete samples, reproduced signal levels between the sample points cannot necessarily reflect the correct signal levels of the original signal. FIGS. 2B and 2C show a further progression of the sample points to earlier points in time, with accompanying further distortions of the reproduced signal. FIG. 2D shows a sample point again positioned immediately prior to the transition A in the original signal, with the reproduced signal almost back to that shown in FIG. 2A.

Figure 3A:
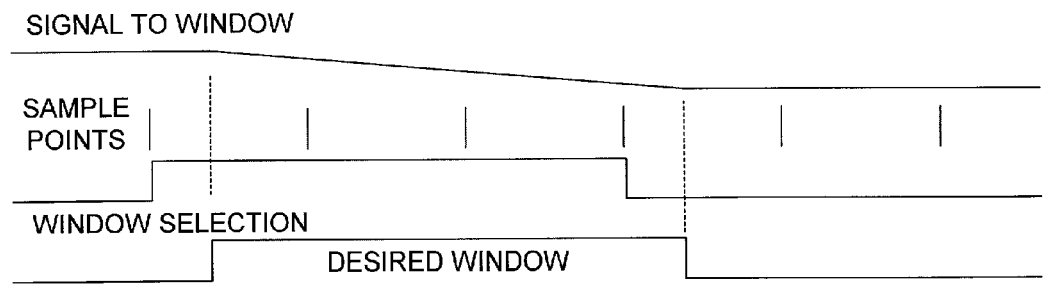
Figure 3B:
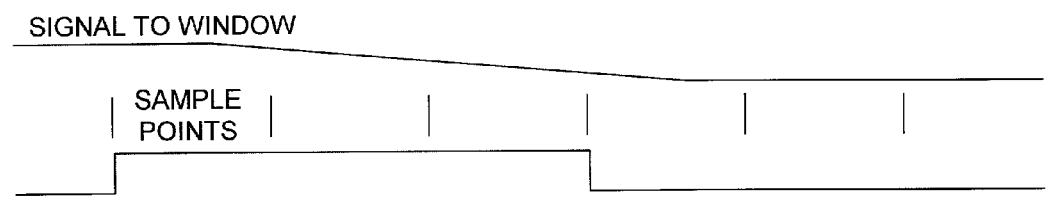
Figure 3C:
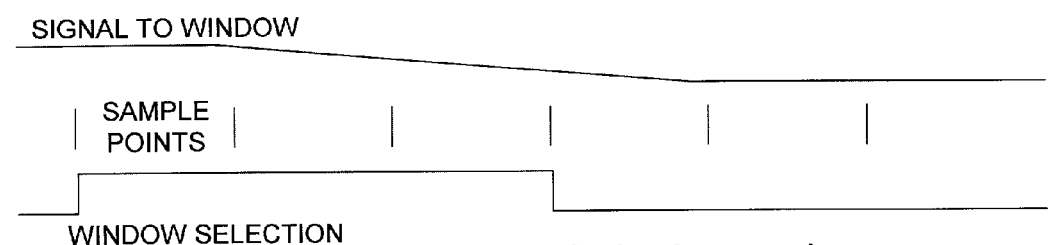
Figure 3D:
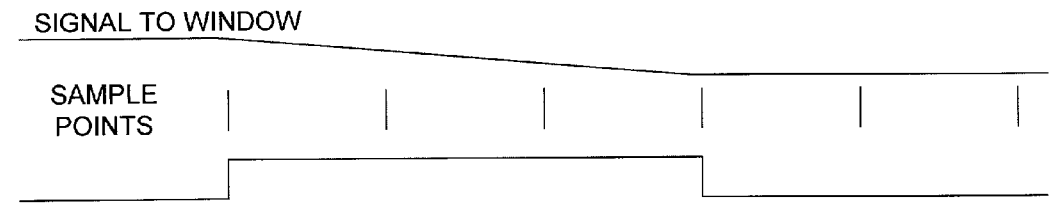

FIGS. 3A–3D illustrate a related problem in reproducing a desired time window. In FIG. 3A, the lower waveform is a desired time window, shown as a higher-level signal for a desired time that corresponds to three sampling intervals, and also corresponds to a portion of an analog signal shown as the upper waveform in all of the figures. Appearing above the desired window in FIG. 3A, and appearing as the lower waveform in FIGS. 3B–D, is a reproduced window. Because of the limitation of digital sampling, the reproduced window is constrained to have transitions only at the sample points. Thus, in FIG. 3A, the reproduced window begins at the sample point immediately preceding the start of the desired window, and ends three sample intervals later. In FIGS. 3B and 3C, the reproduced window is shifted progressively earlier with respect to the desired window. In FIG. 3D, the reproduced window corresponds with the position of the desired window momentarily.

In terms of GPS signal processing, windows are used to mitigate multipath effects, as described in the aforementioned patents. Unfortunately, however, the actual position of the windows varies over as much as a sampling interval from the desired position.

In accordance with the present invention, means are provided for effectively dividing the sampling interval into smaller time increments, thereby providing a way of generating a waveform or window that more exactly matches the characteristics of the desired waveform or window, at least in terms of the temporal characteristics. For continuously varying or analog signals or windows, the invention also provides means for more exactly matching the magnitude characteristics of a reproduced waveform or window with those characteristics of the desired or original waveform or window.

Figure 4A:
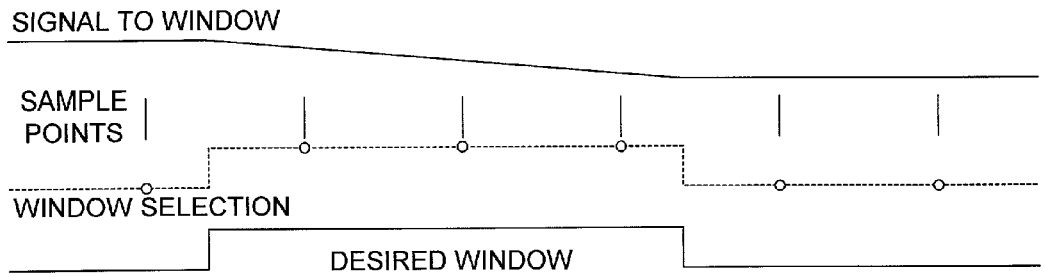
Figure 4B:
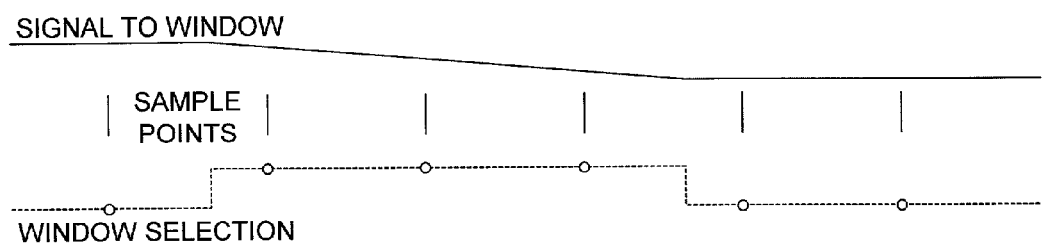
Figure 4C:
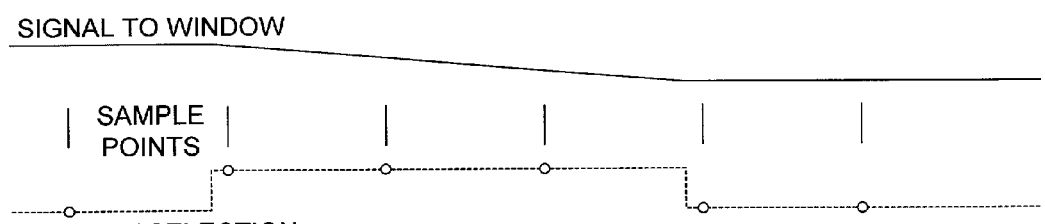
Figure 4D:
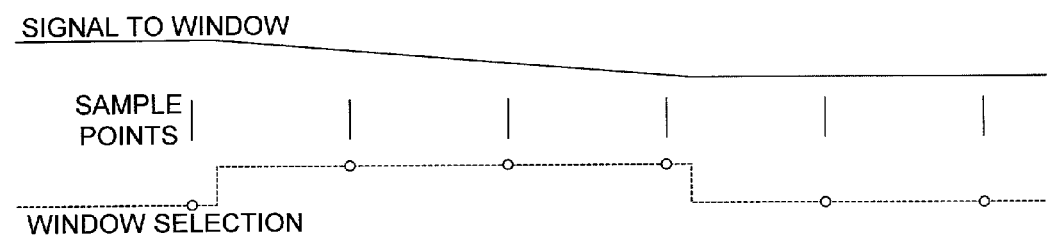
Figure 5A:
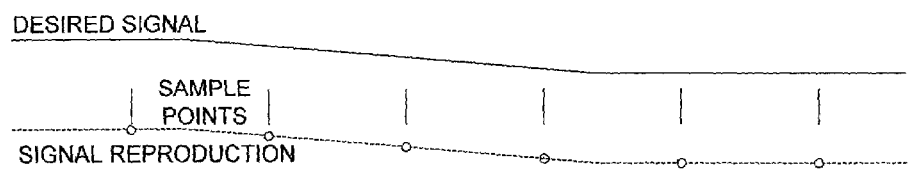
Figure 5B:
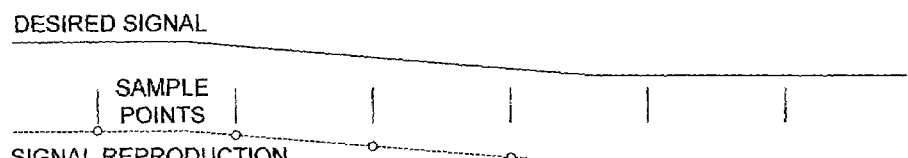
Figure 5C:
Figure 5D:
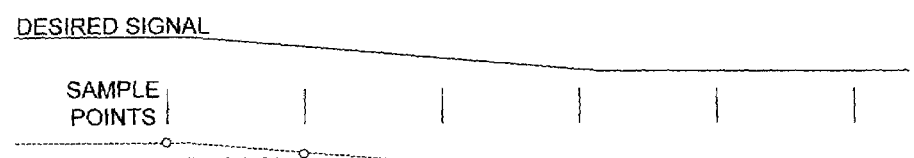

FIGS. 4A–4D depicts how a window is generated in accordance with invention to match desired temporal characteristics. The upper waveform is, as in earlier figures, a portion of a periodic analog signal. The lower trace in FIG. 4A is the desired window, which matches an interval of interest in the periodic signal. Because of the time errors described above, the sample points drift in time and are shown as occurring progressively earlier in the sequence of four figures. The broken line in each figure is the window generated in accordance with the invention, and it will be seen to match the desired window in each instance, regardless of the relative positions of the sample points. These figures are similar to FIGS. 3A–3D, except that the reproduced window in FIGS. 4A–4D, shown as broken lines, corresponds more exactly with the desired window.

FIGS. 5A–5D show the reproduction of a portion of a periodic signal over a number of signal periods in which the sample points drift in time from one period to the next. These figures are similar to FIGS. 2A–2D, except that the reproduced signal in FIGS. 5A–5D, shown as broken lines, corresponds more exactly with original signal waveform, shown as a solid line at the top of each figure.

FIGS. 4A–4D and FIGS. 5A–5D illustrate the result of employing the invention for effectively dividing the sampling interval into smaller time increments, thereby providing a way of generating a waveform or window that more exactly matches the characteristics of the desired waveform or window, at least in terms of the temporal characteristics.

How this finer time resolution is achieved depends in part on the nature of the application of the invention. By way of example, application of the invention to a GPS receiver will now be described in detail.

Figure 6:
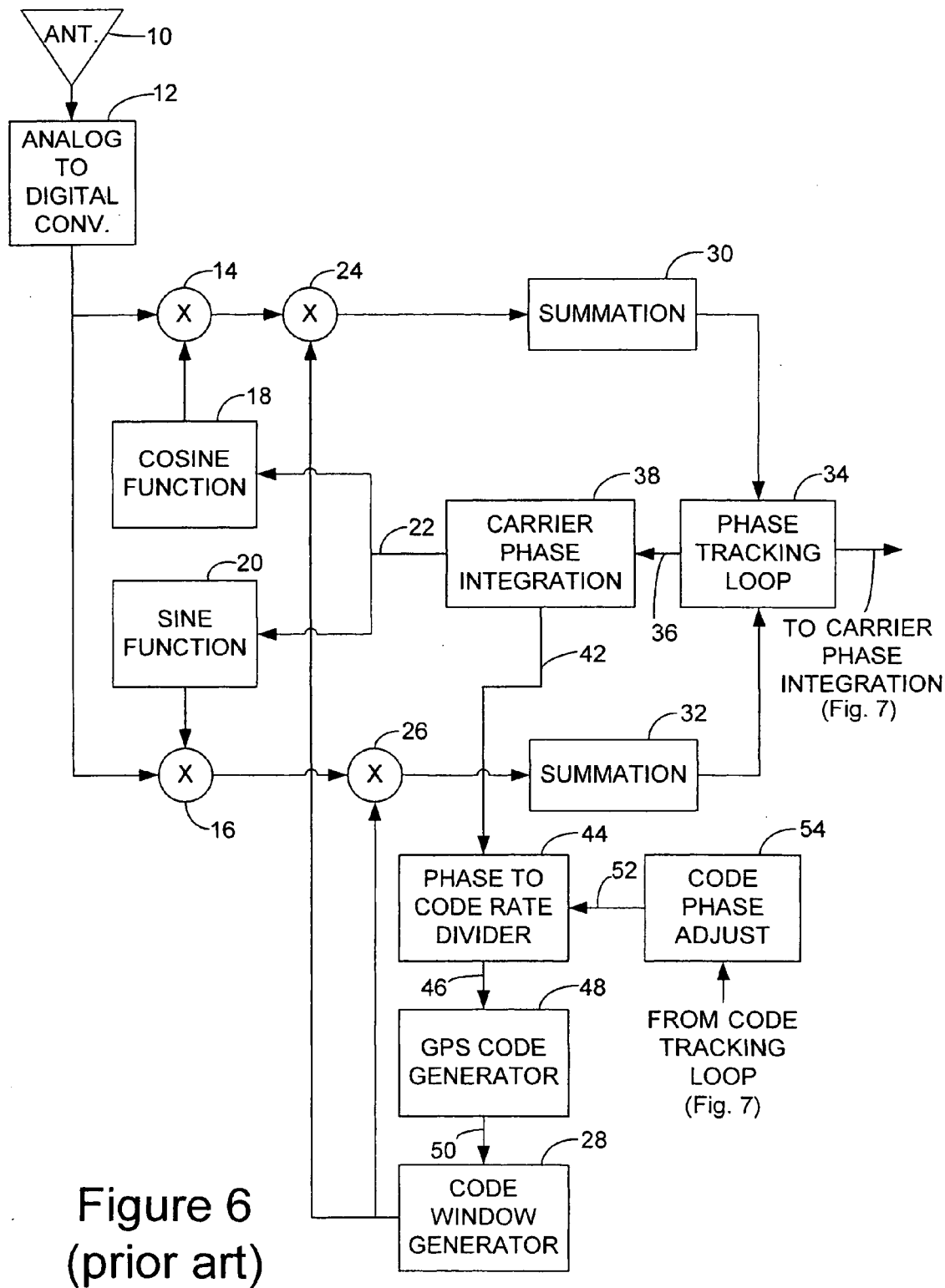
FIG. 6 is simplified block diagram showing relevant components of a conventional GPS receiver.
Figure 7:
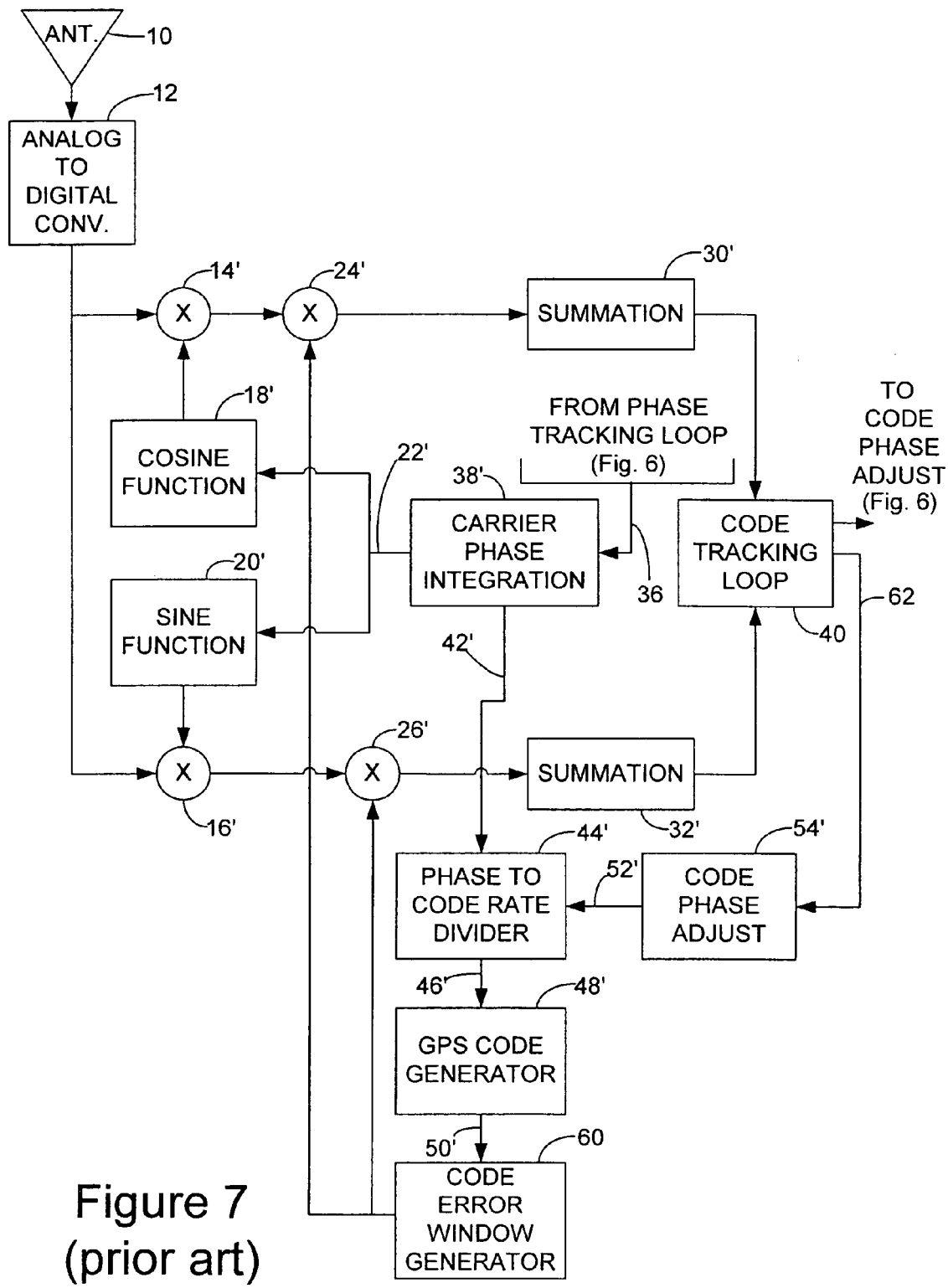
FIG. 7 is a simplified block diagram showing additional components of the GPS receiver of FIG. 6 for performing a code tracking function.

FIGS. 6 and 7 depict relevant portions of a conventional GPS receiver in block diagram form. It will be understood that these figures show only portions of a single channel of a GPS receiver, which, in a practical embodiment, necessarily includes multiple channels for processing signals from multiple satellites. Since GPS satellite signals are transmitted using two separate carrier frequencies encoded with two different pseudorandom noise (PRN) codes, it will also be understood that FIGS. 6 and 7 have omitted much detail in this regard. It will also be apparent that the figures do not include any depiction of means for retrieving message data coded into the signals, or for computing the position of the receiver. In brief, then, the present invention as applied to GPS receivers is concerned only with the GPS receiver functions of phase tracking, i.e., synchronization, and code tracking.

For convenience of discussion, the functions of phase tracking and code tracking have been separated and shown in FIGS. 6 and 7, respectively. The GPS receiver includes an antenna, indicated by reference numeral 10, for receiving the GPS signals, and an analog-to-digital converter 12. The latter provides conversion of the incoming signals to digital form. The resulting digital signals may be as small as one bit in length, representing two possible digital levels, or as long five bits (thirty-two levels), or more. Other conventional radio-frequency (RF) functions, such as down-conversion to an intermediate frequency (IF) may be included in the receiver but have been omitted for simplicity. The converter 12 is usually sampled at a rate related to a system clock, or to an intermediate frequency. Before continuing with the description of signal flow, it is appropriate first to summarize the nature of GPS signals.

Each satellite transmits signals on two carrier frequencies, referred to as L1 and L2, and employs two pseudorandom noise (PRN) code sequences, known as the precision code (P code) and the coarse/acquisition code (C/A code). These PRN code sequences are unique to each satellite, and they serve to identify the satellites in the GPS receiver. The receiver has multiple channels, each of which "tunes" to one satellite signal by identifying the code sequence associated with that satellite. For present purposes, however, we need to consider only a single carrier signal modulated with a single PRN code sequence. The presence of another carrier signal, and of multiple signals from other satellites, does not affect the explanation that follows. The carrier signal is modulated by phase-shift keying in accordance with the PRN code sequence. The resulting signal is a spread-spectrum signal in which the fundamental carrier frequency is suppressed. The signal is "acquired" by the receiver when the carrier signal is successfully synchronized or tracked by the receiver, and when the code sequence is also successfully synchronized with a locally generated code in the receiver. Once both carrier (or phase) tracking and code tracking have been achieved, encoded ephemeris data can be recovered from the carrier, and estimates of the satellite ranges can be computed.

As shown in FIG. 6, the incoming signal from the analog-to-digital converter 12 is coupled to two multipliers 14 and 16, for multiplication by a cosine value generated by a cosine function generator 18 and a sine value generated by a sine function generator 20, respectively. The sine and cosine values are functions of a phase signal supplied to the generators 18 and 20 over line 22. The two multipliers 14 and 16 function to demodulate the incoming signal, in the sense that the carrier signal is removed by this operation. The outputs of the multipliers 14 and 16 are coupled to two additional "multipliers" 24 and 26, respectively. The other inputs to these multipliers 24 and 26 is a code window, usually in the form of a binary signal with values 1, 0, or −1, derived from a code window generator 28. The sign of the window is exclusive-ORed with the sign of the other respective inputs to the multipliers 24 and 26. (A minus window value changes the sign of the other input; a plus window value does not.) The zero value is applied as in a logical AND function with the other respective inputs, such that the outputs of the multipliers 24 and 26 are zeroed out if the window value is zero. The outputs of the multipliers 24 and 26 are summed independently in summation circuits 30 and 32, respectively, for the cosine and sine signals, and the summations are made available to a conventional phase tracking loop 34.

One method of phase tracking is to maximize the cosine channel signal, which is the in-phase (I) signal provided by summation circuit 30, and to minimize the sine channel signal, which is the quadrature-phase signal (Q) provided by summation circuit 32, generating a frequency as output on line 36. The frequency output is coupled to a carrier phase integration unit 38, which integrates the frequency input signals and produces the carrier phase signals on line 22, used to control the cosine and sine function generators 18 and 20. The cosine and sine function generators 18 and 20 may, for example, take the form of simple look-up tables, from which the sine and cosine values are obtained for any given phase angle supplied on line 22.

As mentioned above, the code window generator 28 in a conventional GPS receiver typically generates a binary signal as output to the multipliers 26 and 28. The remaining blocks in FIG. 6 illustrate how the code window generator 28 is interconnected with the phase tracking loop 34 and with a code tracking loop 40, which is shown in more detail in FIG. 7. The carrier phase integration unit 38 provides a signal on line 42 to a phase-to-code rate divider 44.

Each PRN code sequence in a received GPS signal is synchronous with cycles of the carrier signal that the code sequence modulates. A typical GPS receiver produces a timing signal at some rate that can be divided down to the code rate and controlled by the code tracking loop 40. Therefore, the phase-to-code rate divider 44 can be designed to produce (on line 46) a phase-related timing signal that can be utilized by a GPS code generator 48. For example, the phase-to-code rate divider 44 may include a divider that would count up to some predetermined number of states before issuing a clock signal to the GPS code generator 48. The code generator 48 takes the timing signals received over line 46 from the phase-to-code rate divider 44 and produces, on line 50 to the code window generator 28, the next GPS code, for a particular satellite and code selection (P-code or C/A code). More specific details relating to generation of GPS codes and code windows are provided in the aforementioned prior patents. The phase-to-code rate divider 44 also receives code adjustment signals over line 52 from a code phase adjust circuit 54, which is in turn coupled to receive control signals from the code tracking loop 40, to be described next. Basically, the phase-to-code divider 44 shifts the value in the divider under control of the code phase adjust circuit 54, to provide for alignment of the locally generated code. The code phase adjust function may be implemented simply to generate timing pulses that instruct the phase-to-code divider 44 to advance, retard, or continue the clocking function. Alternatively, code phase adjustment may include more complex circuitry to add a desired phase adjustment to the code phase information generated in the phase-to-code rate divider 44.

FIG. 7 illustrates the function of code tracking in a typical GPS receiver. It will be observed that many of the components are the same as in FIG. 6. The antenna 10 and the analog-to-digital converter 12 are, of course the same ones as shown in FIG. 6. Other components performing the same function as their counterparts in FIG. 6 are referred to by primed reference numerals. Thus, code tracking function uses multipliers 14' and 16' in conjunction with cosine and sine functions 18' and 20', multipliers 24' and 26', summation circuits 30' and 32', a carrier phase integration circuit 38', a phase-to-code rate divider 44', a code phase adjust circuit 54', and a GPS code generator 48'. The carrier phase integration circuit 38' receives frequency signals on line 36 from the phase tracking loop shown in FIG. 6. The code tracking loop 40 receives in phase (I) and quadrature (Q) outputs from the summation circuits 30' and 32' that have been generated using a code error window produced by a code error window generator 60. The code tracking loop 40 produces an error signal designed to locate a tracking null of the GPS code error signal. The error signal is coupled over line 62 to the code phase adjust circuit 54', which generates code phase adjustment signals on line 52' to the phase-to-code rate divider 44'. The divider 44' makes appropriate adjustments in the clock signals transmitted over line 46' to the GPS code generator 48', thereby tracking the code signals. The code error window generator 60 for a typical GPS receiver generates a binary signal with values 1, 0 or −1. The sign of the window is exclusive-ORed with the sign of the other respective inputs to the multipliers 24' and 26'. (A minus window value changes the sign of the other input; a plus window value does not.) The zero value is applied as in a logical AND function with the other respective inputs, such that the output of the multipliers 24' and 26' are zeroed out if the window value is zero. As discussed with reference to FIG. 6, the code tracking information is used to adjust the code phase in the generation of the code windows in the code window generator 28.

Figure 8:
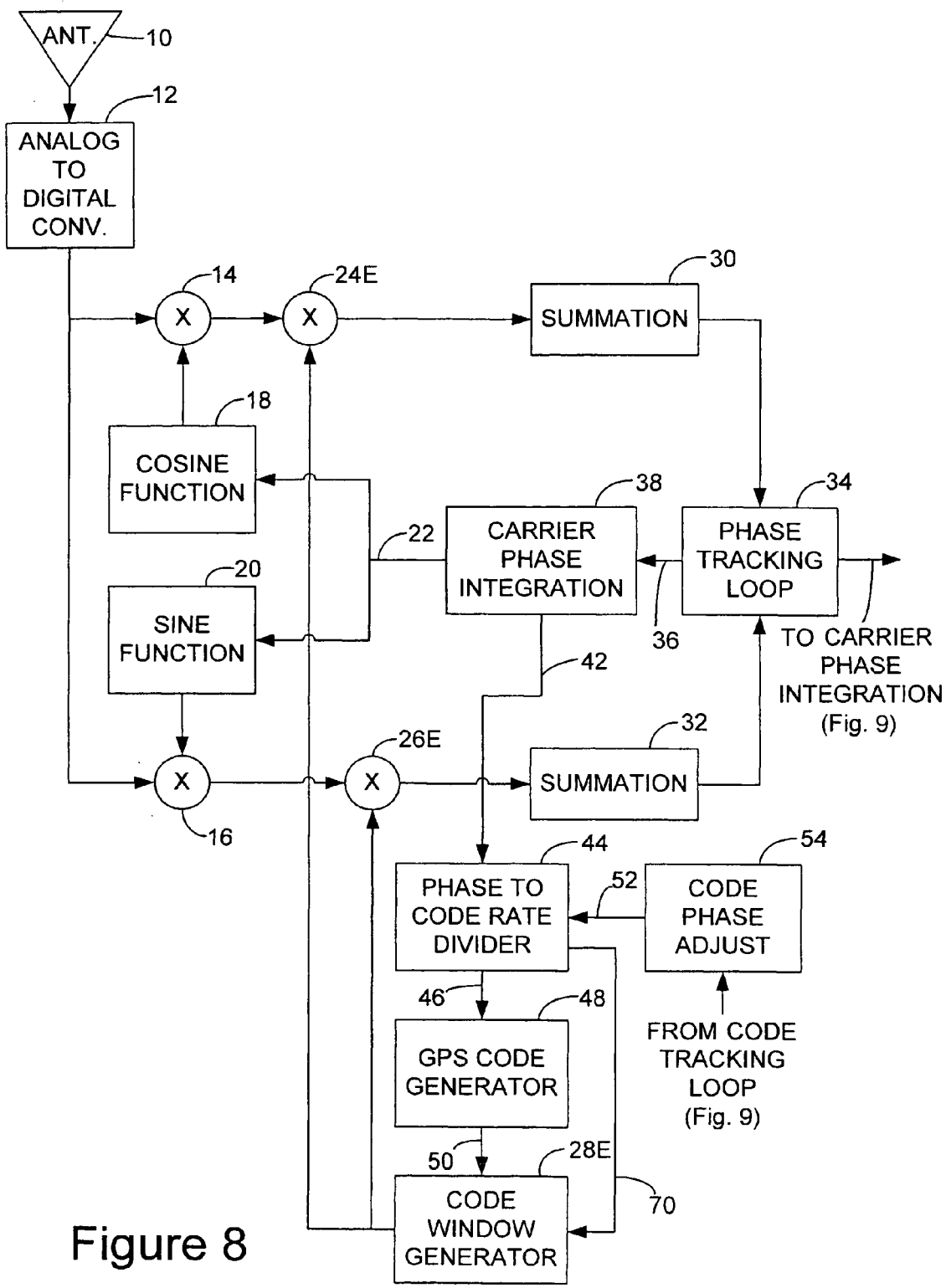
FIG. 8 is a simplified block diagram similar to FIG. 6 but enhanced in accordance with the invention.
Figure 9:
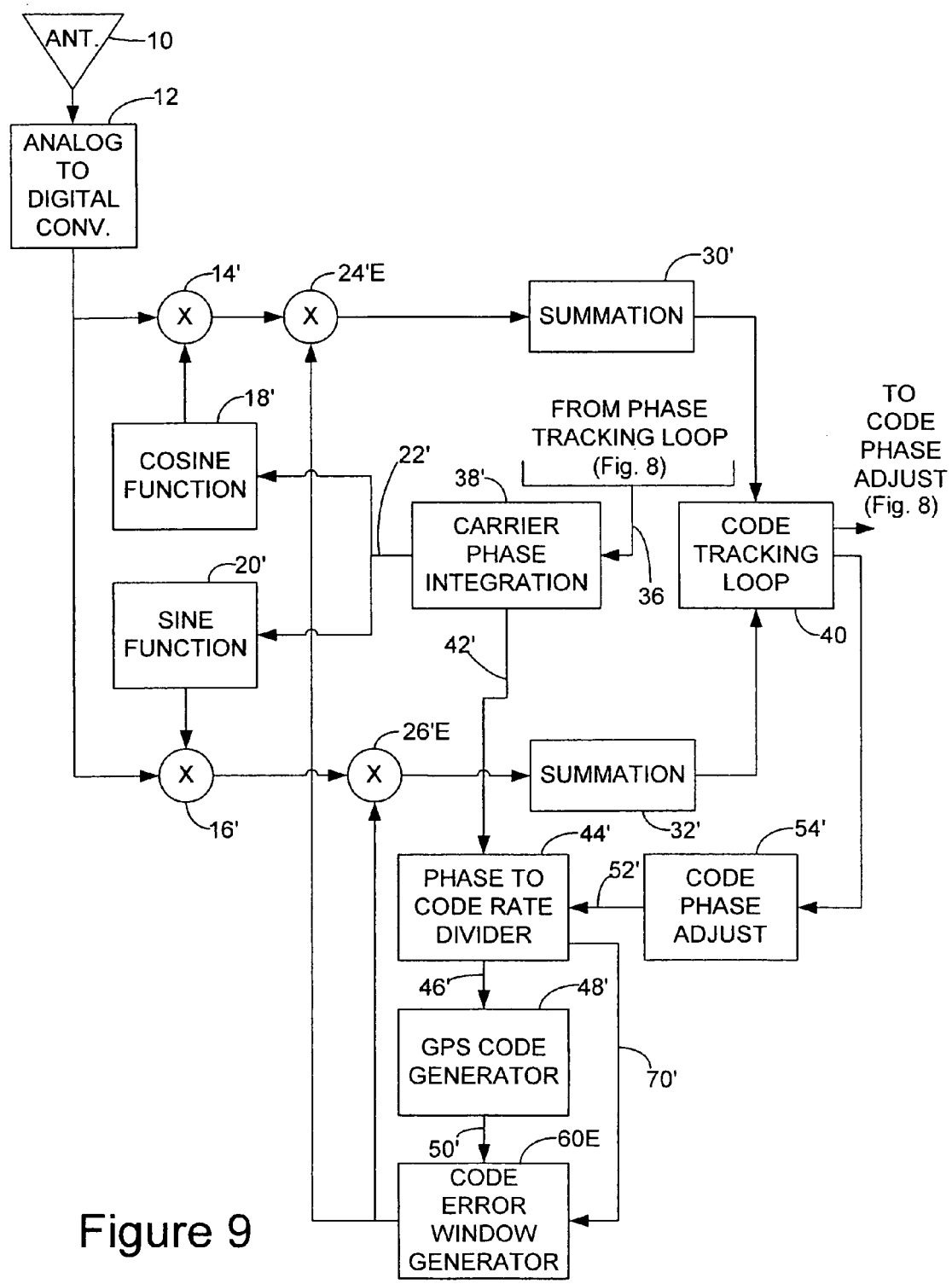
FIG. 9 is a simplified block diagram similar to FIG. 7 but enhanced in accordance with the invention.

FIGS. 8 and 9 depict the enhanced GPS receiver of the present invention. Components of the enhanced GPS receiver that are identical to corresponding components in FIGS. 6 and 7 are identified by identical reference numerals and perform identical functions. Components that are different in the enhanced receiver are identified by reference numerals that include the suffix 'E.' Specifically, the code window generator in FIG. 8 is identified by reference numeral 28E. The code window generator 28E produces a windowing output signal that can be any value, not just a binary signal with values 1, 0, or −1. For convenience, the windowing output signals from the code window generator 28E are represented as scaled integer values, and the multipliers 24E and 26E are integer multipliers. Another major difference between FIG. 8 and FIG. 6 is that the code window generator 28E receives code phase information over a new line 70 from the phase-to-code rate divider 44. This code phase information allows the code window generator 28E to determine the position of a code event to a higher resolution than the sampling clock, the resolution being limited only by that of the divider 44. Therefore, the code window generator 28E is capable of producing a windowing signal of any desired profile.

Similar improvements are to be found in the enhanced GPS code tracking function, as depicted in FIG. 9. Specifically, code tracking in accordance with the invention includes an enhanced code error window generator 60E, which produces code error windowing signals of any desired magnitude. Once again, for convenience these signals are represented as scaled integers, which are fed to integer multipliers 24'E and 26'E. Code phase information is provided to the enhanced code error window generator 60E over line 70' from the phase-to-code rate divider 44'E, allowing the enhanced code error window generator 60E to produce a windowing signal of any desired profile.

Figure 10:
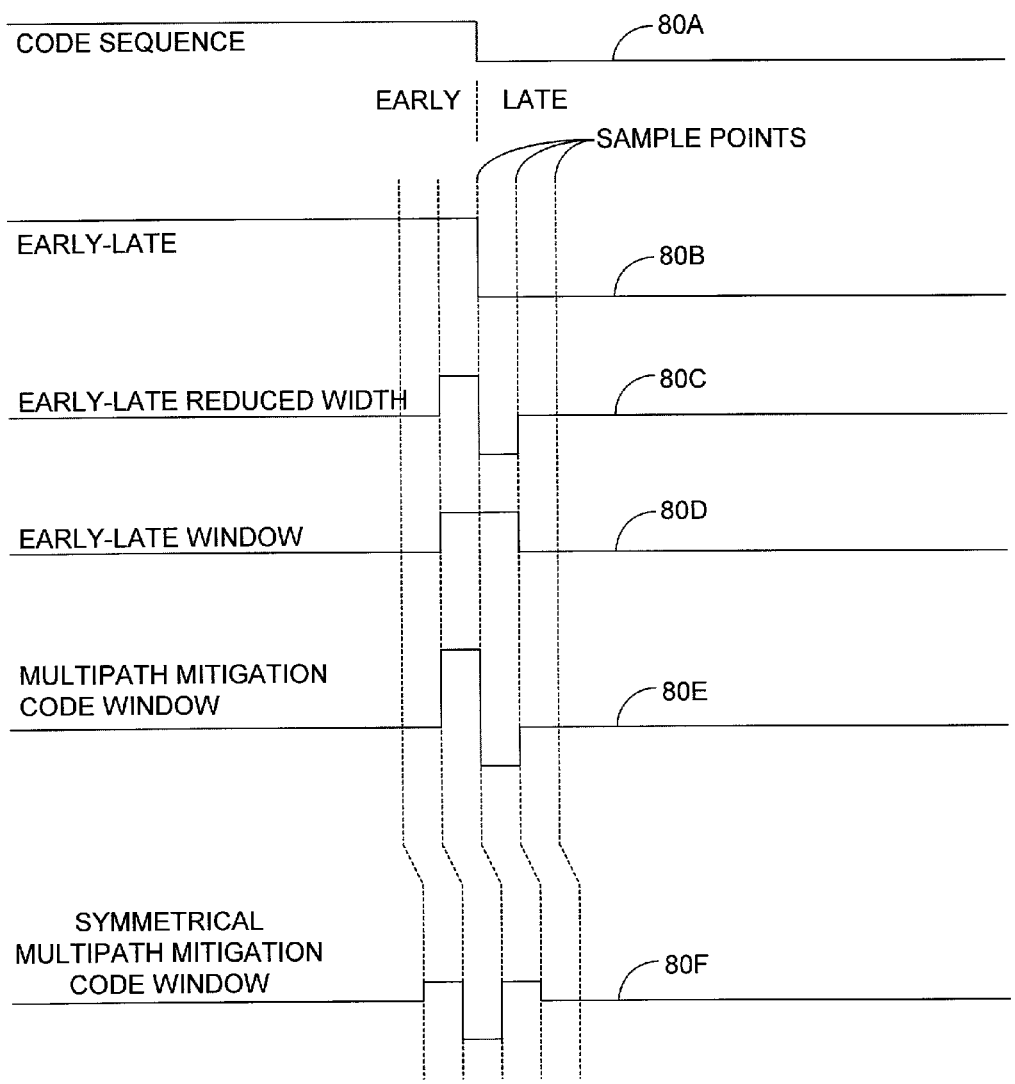
FIG. 10 is series of waveforms showing generation of GPS signal window generation using prior art techniques.

FIG. 10 shows in simplified form the derivation of various code transition windows in the prior art. The top curve 80A depicts a single transition in a code sequence from a lower value to a higher value, such as from −1 to +1. A simple approach to windowing is to collect code signal power over the entire interval of the code sequence before the transition, i.e., "early," and then to collect power over the entire code sequence after the transition, i.e., "late," as shown in the curve 80B. The vertical broken lines indicate sampling intervals. It has long been recognized that a reduction in unwanted multipath effects on GPS signals could be achieved by using a narrower window that focused more closely on the code transition point. This narrow window is shown at 80C, and is positive (+1) for one sampling interval prior to the transition, and negative (−1) for one sampling interval after the transition. If this waveform is "multiplied" by the desired code transition (80A), an early-late transition window 80D results, with a positive value (+1) extending for one sampling interval each side of the transition point. As described more fully in the aforementioned U.S. Pat. No. 5,963,582, multipath effects can be further mitigated by generating code windows such as those shown at 80E and 80F. The window shown at 80E has a value of +2 for one sampling interval prior to the transition and a value of −1 for one sampling interval after the transition. The window shown at 80F is a symmetrical window having a central segment that is one sampling interval in width and a negative value (−1), and two outer segments each one sampling interval in width and a positive value (+½). For convenience, the vertical broken lines indicating the sampling intervals have been offset to depict this window as being centered on the code transition point. It will be understood that the windows shown may also be generated with their polarities reversed for use in detecting transitions opposite to the one shown at 80A.

The advantages of these windows 80E and 80F, and of other similar multipath mitigation windows have been fully described in U.S. Pat. No. 5,963,582. The windows are shown here only to illustrate their inherent limitations. Because all of the windows of the prior art are obtained by logically combining time-shifted versions of the code sequence, the width of any window segment is limited to one sampling interval or multiples thereof. Similarly, the magnitudes of window segments are limited to multiples or sub-multiples of the code signal levels.

Figure 11:
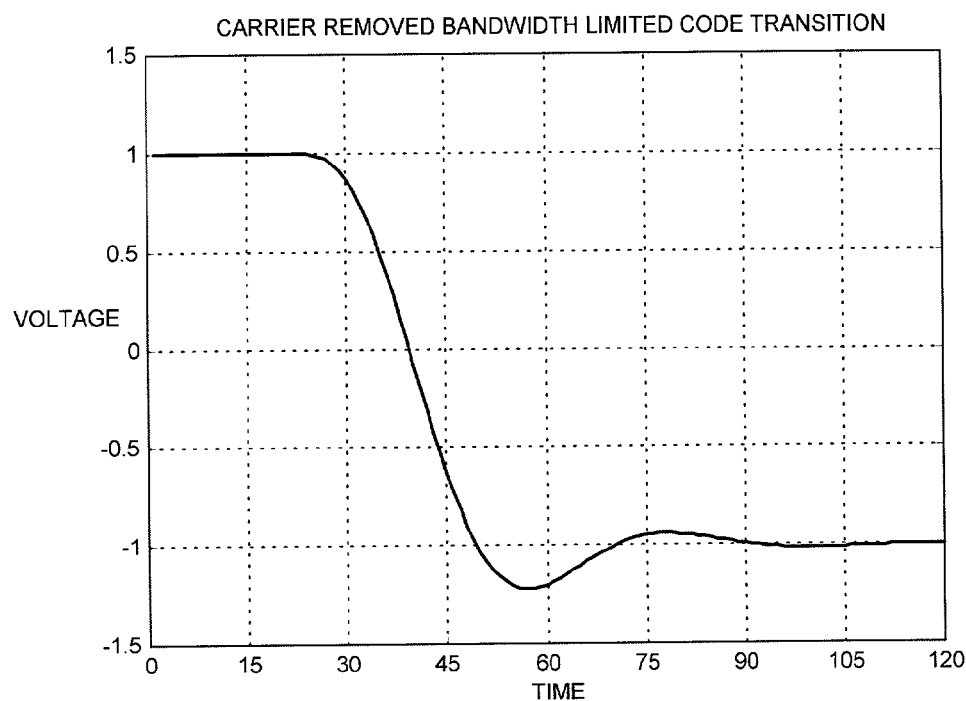
FIG. 11 is a graph depicting the waveform of a digital signal transition event as received through a limited-bandwidth communication channel.

Analysis of the advantages of the code transition windows discussed above, in mitigating multipath effects, has in the past been based on the assumption that code transitions in GPS signals are abrupt changes from one logical signal level to another. As a practical matter, this is not the case. Transmission of GPS signals from a satellite to a GPS receiver is made through a bandwidth-limited channel, and it is well known that an abrupt step transition in signal level cannot be transmitted without having near-infinite bandwidth. FIG. 11 is a graph representing a negative code transition as seen at the receiving end of a bandwidth-limited transmission channel. As mentioned earlier, GPS code sequences are modulated onto a carrier by phase-shift keying, i.e., by imposing abrupt shifts in carrier phase. FIG. 11 represents a code transition after removal of the carrier, by multiplying the sine and cosine functions in multipliers 14 and 16 (FIG. 6). FIG. 11 shows a transition of a received code from +1 volt to −1 volt, although the magnitude scale is of little importance. The time scale is also of no importance in the present discussion. The waveform of FIG. 11 is still an idealized one in the sense that there is an assumed absence of signal corrupting influences, such as noise and multipath effects. The waveform does, however, take account of the very significant effect of the bandwidth limitation of a practical transmission channel. It will be seen that the transition begins gradually, increases in rate, then decreases in rate and overshoots the lower signal level, first in a negative direction, then in a positive direction, before converging on the new level to complete the transition.

Figure 12:
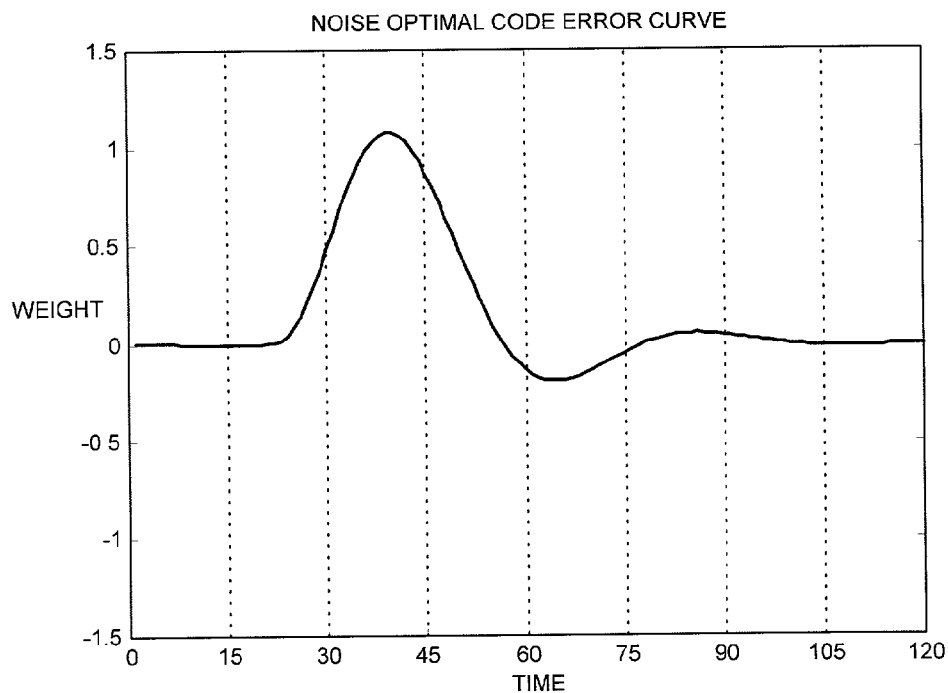
FIG. 12 is a graph depicting the waveform of an optimum code error window best suited for use in detecting the signal transition waveform of FIG. 11.

FIG. 12 depicts the waveform of an optimal code error window for tracking the code transition shown in FIG. 11, and extracting the maximum amount of information from the transition. The curve is optimal for noise performance, or signal power performance in a bandwidth-limited environment, and is drawn to an arbitrary "weight" scale and to the same time scale as FIG. 11. The waveform of FIG. 12 happens to be the time derivative of the waveform of FIG. 11. Generating a code window or code error window of this shape is not possible using prior art technology because the prior art is limited to using window magnitudes that are multiples or sub-multiples of the code magnitude, and temporal window dimensions that are multiples of the code sampling interval.

Figure 13:
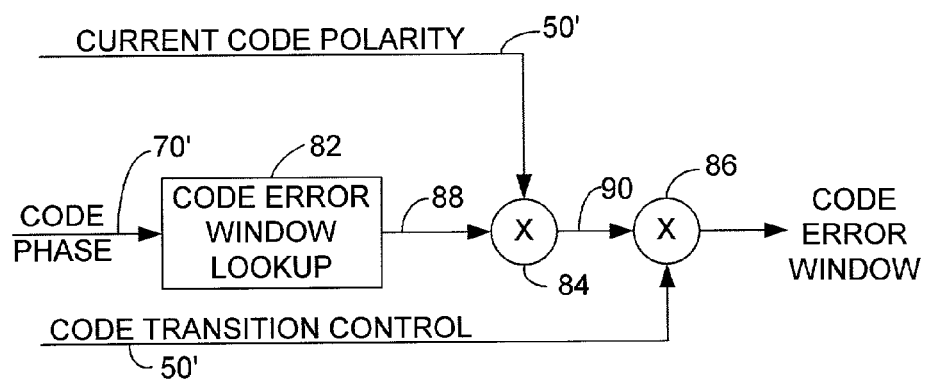
FIG. 13 is a mathematical signal diagram depicting the principal functions of a code error window generator used to generate a signal window such as the one shown in FIG. 12.

FIG. 13 is a signal flow diagram depicting the function of one implementation of the enhanced code window generator 60E (FIG. 9). Included are a code error window lookup function 82 and two multipliers 84 and 86. The current code phase value is supplied over line 70' from the phase-to-code rate divider 44' (FIG. 9). The code phase can be in the form of an integer value in the range, for example, of 0–1,540, and is used as an index to look up a code error value corresponding to this particular code phase. A code phase value of zero represents the code phase at an instant in time when the code transition occurs as desired by the code tracking loop. In effect, the code phase indicates the error in reproduction of the locally generated code signal caused by digital sampling and clocking of the digital GPS receiver. The actual range of the code phase is not critical to the invention but could be arranged, for example, such that each code phase value represents a cycle of the L1 carrier in measuring the time difference between the current sample and the code transition.

The code error window output values from the code error window lookup function 82 are applied over line 88 to the first multiplier 84, the other input of which is a current code polarity signal, which may be considered to be provided over line 50' from the GPS code generator 48'. The code polarity signal logical value of +1 or −1, indicating the GPS code state prior to each transition. Thus, the output of the multiplier 84, on line 90, is a code error window value of a polarity appropriate to the polarity of the transition. This code error value is effectively ANDed with another logical signal from the GPS code generator 48', namely a code transition control signal indicating that a code transition is about to occur, or has just occurred. This ensures that the code error function is activated only during a code transition and not at potential code transitions where no polarity change occurs. Depending on the resolution desired, the code phase values may be scaled appropriately. For example, the following table shows code error window values generated as a series of eleven code phase values that have been scaled by a factor of 16. The table was derived from the waveform of FIG. 12 by scaling the figure by this factor. The table is but one example showing how a waveform such as that of FIG. 12 might be implemented in practice.

| Scaled Code Phase Value | Code Error Window Value |
|---|---|
| 10 | 0 |
| 20 | 6 |
| 30 | 13 |
| 40 | 17 |
| 50 | 14 |
| 60 | 8 |
| 70 | 2 |
| 80 | −1 |
| 90 | −3 |
| 100 | −2 |
| 110 | −1 |

The code error window lookup function 82 can be implemented in hardware as a multiplexer (MUX) controlled by the code phase value to output the values shown above. Alternatively, the implementation may be in software form, either as a mathematical function or as a table lookup with constant values as outputs, as indicated in the table above. Regardless of implementation, the window generated can closely follow any desired profile, such as the profile of the waveform shown in FIG. 12.

Figure 14:
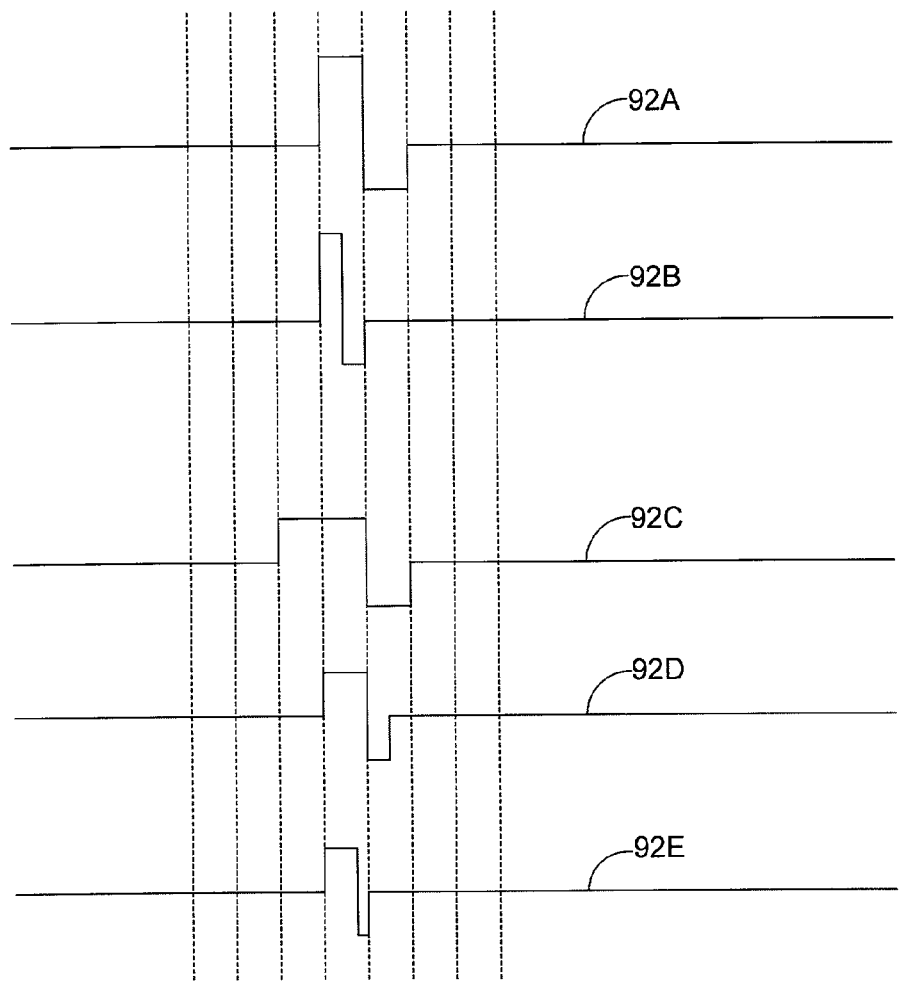
FIG. 14 is a series of digital signal windows that can be generated using the present invention.

FIG. 14 provides further examples of the window waveforms that can be generated using the present invention. These are simple digital window profiles, without the need for shaping the window magnitude as described with reference to FIG. 13. Even with digital waveforms, however, the invention provides significant improvement in windowing for multipath mitigation. The upper waveform 92A is an existing asymmetrical multipath mitigation window, consisting of two segments, each of which is one sampling interval in width. Waveform 92B depicts a similar asymmetrical multipath mitigation window, but with the entire two segments falling within one sampling interval. Waveform 92C depicts another existing multipath mitigation window, consisting of a first segment two sampling intervals in width and a second segment of opposite polarity and one sampling interval in width. Waveform 92D has the same shape as waveform 92C but is only half the width in the time axis. Use of the invention permits formation of the second segment to have a width of only half, or any desired fractional portion, of a sampling interval. Finally, waveform 92E is a further compressed version of the window, having an overall width of only one sampling interval, one third that of the existing window 92C. The narrower windows shown at 92B, 92D and 92E provide a sharper cutoff at the code transition and a reduced error signal available on the narrow or "late" side of the window, to enhance multipath mitigation performance.

Figure 15:
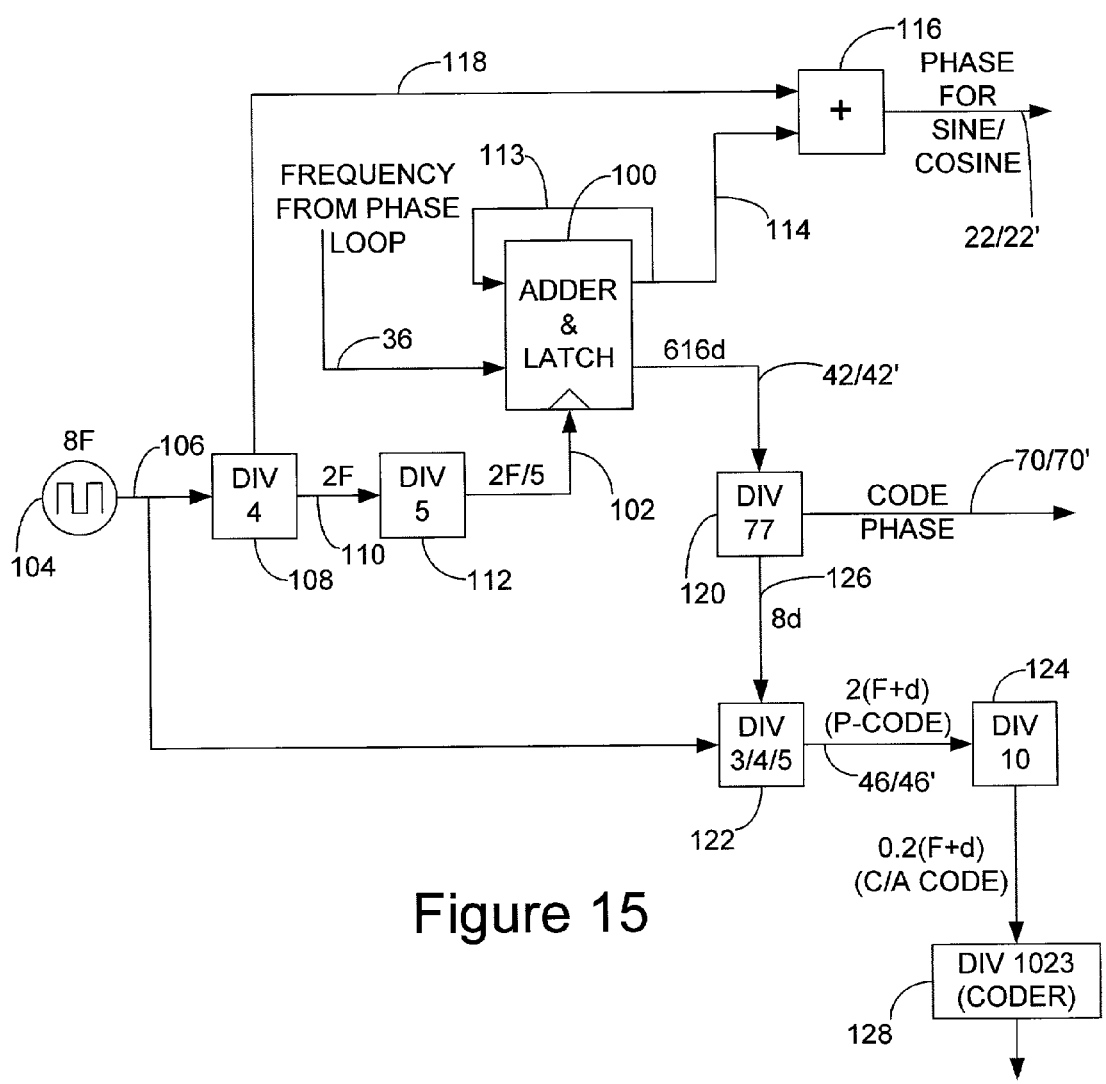
FIG. 15 is a fragmentary block diagram depicting portions of a carrier phase integration unit and a phase-to-code rate divider used in the GPS receiver of FIGS. 8 and 9 in accordance with the invention.

A more specific GPS embodiment of the invention is shown in FIG. 15, which will now be used to explain further the operation of the carrier phase integration unit 38 or 38' and the phase-to-code rate divider 44 or 44', and the derivation of a code phase value on line 70 or 70'. Frequency values from the phase tracking loop 34 (FIG. 6) are supplied on line 36 to an adder and latch 100, which is a basic component of the carrier phase integration unit 38 or 38'. For purposes of this more detailed diagram, the frequency signals on line 36 include only a Doppler (or other frequency)

error component d, scaled in accordance with the illustrative frequency plan to a value 308d. It will be understood that line 36 in fact includes multiple digital signal lines carrying a digital representation of the frequency 308d. The adder 100 is clocked by a signal, on line 102, that is derived from a clock source 104. In the particular frequency plan for the receiver illustrated, the clock source operates at a frequency 8F, where F=5.115 MHz (megahertz). Although the absolute values of frequencies and frequency divider ratios employed are of no consequence to the present invention, specifying them will serve to provide an example of one implementation of the invention. The clock source signal is connected by line 106 to a divide-by-4 circuit 108, the output of which, at frequency 2F, is connected by line 110 to a divide-by-5 circuit 112. The latter circuit 112 provides an output on line 102 at a frequency 2F/5, which is the signal used to clock the adder and latch 100.

The frequency values provided on line 36 from the phase tracking loop 34 are added into a binary register/latch of the adder 100 at a clock rate of 2F/5. The frequency chosen for this clock rate determines the units required for input of frequency on line 36. By using a clock rate of 2F/5, the frequency units on line 36 are 1/1.025 Hz, or very near to 1 Hz, which is a convenient number for GPS purposes, but is not critical to the invention. As indicated by a feedback path 113, each time the adder 100 is clocked, the content of its register/latch is added to the current input frequency on line 36. The adder 100 is implemented such that the content of the register/latch represent a full carrier cycle when the register/latch overflows and rolls over. Thus the most significant bit of the register/latch represents a half cycle of phase, the next most significant bit represents a quarter cycle, and so forth. The four most significant bits of the register/latch are output on line 114 to an adder 116. The other input to the adder 116, over line 118, is a pair of bits derived from the divide-by-4 circuit 108 and represents a sample interval count, at a frequency rate of 2F. The four-bit signal on line 118 represents the phase of the 308d frequency signal derived from the adder 100. The two-bit signal on line 118 represents the phase of a 2F reference signal obtained from the divide-by-four circuit 108. When these two sets of signals on lines 118 and 114 are combined in the adder 116, the output of the adder represents the sum of the two inputs, with upper bits discarded and the sum left-aligned. This value represents the phase of a signal of frequency (2F+ 308d) and is made available on line 22 as one of a stream of phase values for use in the cosine and sine function generators 18 and 20 (FIG. 6).

The remaining components in FIG. 15 generate two additional clock signals: a P-code clock signal, a C/A code clock signal. These components include a divide-by-77 circuit 120, a divide-by-3/4/5 circuit 122 and a divide-by-10 circuit 124. The divide-by-77 circuit 120 is the basic component of the phase-to-code rate divider 44. The circuit 120 receives, over line 42, a signal that varies at a rate related to the frequency derived from the phase loop. This signal is derived as one of the bits of the adder and register/latch 100 that represents a frequency of 616d, where d represents the Doppler (and other frequency error) component of the received signal frequency. Therefore, the output of the divide-by-77 circuit 120 is a signal at frequency 8d, on line 126. This output signal on line 126 and the original clock source at frequency 8F, supplied on line 128, are input to the divide-by-3/4/5 circuit 122. The latter circuit functions nominally as a divide-by-4 circuit, producing an output, on line 46, at a frequency of 2F. This, by definition, is the frequency of the P-code signal. The output of the divide-by-77 circuit 120 is used to control the divide-by-3/4/5 circuit 122 in the following manner. When the divide-by-77 circuit 120 rolls over in a positive manner, the divide-by-3/4/5 circuit 122 will add one of the 8F-rate pulses, making one of the output 2F-rate pulses narrower. When the divide-by-77 circuit 120 rolls over negatively, the divide-by-3/4/5 circuit 122 will subtract an 8F-rate pulse, making one of the output 2F-rate pulses wider. Effectively, the output of the divide-by-3/4/5 circuit 122 is a signal at frequency 0.2(F+d). The frequency d may be defined as the Doppler frequency scaled to F units. In other words, the divide-by-77 circuit 120 keep track of the effect of Doppler shifts on the nominal P-code frequency. Although d is referred to as the scaled Doppler frequency, it will be understood from earlier discussion in this specification that the term Doppler is also used to encompass other inevitable differences between a received signal frequency and locally generated clock source of the same nominal frequency. The P-code clock frequency is further divided down in the divide-by-10 circuit 124, to produce a signal at a frequency 0.2(F+d), which is, by definition the C/A code clock frequency. Further division in a divide-by-1023 circuit 128 may be performed to obtain at a signal with a pulse every 1023 C/A code clocks.

Although the foregoing description of the logic of FIG. 15 may appear to be complex, it must be emphasized that the description of FIG. 15 to this point is of a conventional GPS receiver, included only to make the point that the divide-by-77 circuit 120 includes a register that keeps track of Doppler and other frequency differences between a received signal code rate and a locally generated code rate. When the Doppler value is a positive difference, the divide-by-77 circuit 120 will produce output pulses at an 8d rate, which will increase the number of input pulses to the divide-by-3/4/5 circuit 122 by the same rate, and will increase the output rate by 2d. This will maintain downstream clock signals at an appropriate rate that is properly synchronized for Doppler and other differences. When Doppler is a negative difference, the divide-by-77 circuit 120 will generate negative rollover signals at the 8d rate, resulting in fewer pulses emerging from the divide-by-3/4/5 circuit 122, which still generates P-code signals at the rate of 2(F+d).

In accordance with one aspect of the present invention, the contents of the counting register inherent to the divide-by-77 circuit 120 are employed to obtain a continuous indication of the relative phase of the received signal within a sample interval. The Doppler frequency changes relatively slowly with respect to a sample interval rate. For purposes of explanation, one may even consider the value of d to be constant and, for example, positive. In effect, the divide-by-77 circuit 120 generates a periodic (if d were constant) or occasional control signal that adds an additional pulse to the input of the divide-by-3/4/5 circuit 122, to compensate for the frequency difference (2d) between the locally generated P-code clock signals (at rate 2F) and the received P-code rate (2F+2d). As the Doppler-related count accumulates in the divide-by-77 circuit 120, the value of the count represents a sub-sample-interval code phase difference between the locally generated P-code clock rate and the received P-code rate. Therefore, in accordance with this aspect of the invention, the divide-by-77 counter provides an output, on line 70 or 70', with a count or scaled count that represents the relative code phase within a locally generated sampling interval. This sub-sample measurement is used in the code window generator 60 or in the code error window generator 60E, to provide more accurate time measurements for generation of a window with a desired profile.

It will be understood from the foregoing illustration of the application of the invention to GPS receivers that the divider 120 (the divide-by-77 circuit) functions in the manner of a vernier scale, by means of which a sample time interval can be subdivided into smaller measurable increments. In the GPS receiver, there is an unavoidable difference between clock signals generated in the receiver and nominally similar clock signals generated in a satellite. Part of this difference is due to a slowly changing Doppler frequency and part of it is due to the inherent inability of the local clock signals to match their counterparts that are generated in a satellite and precisely controlled and synchronized from ground stations. What the invention does in the context of as GPS receiver is to take advantage of existing measurements being made to compensate for this frequency difference, and to utilize these measurements for the purpose of reproducing signals and signal windows more accurately. The same principle may also be used in other applications where there is an available frequency difference that facilitates subdivision of a sampling frequency, as illustrated more generally in FIG. 16.

Figure 16:
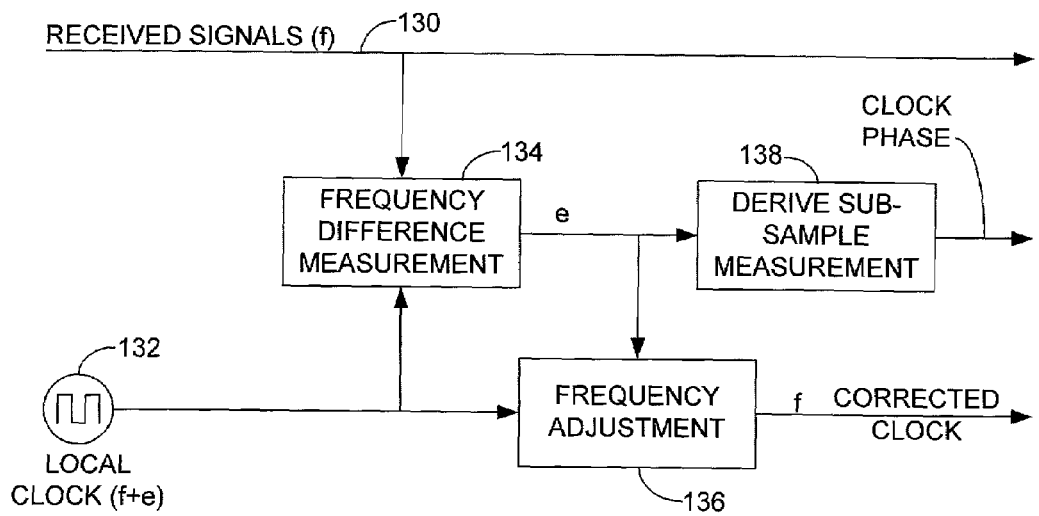
FIG. 16 is a simplified block diagram showing in general how a frequency error is used to obtain sub-sample temporal resolution in accordance with the invention.

FIG. 16 is a block diagram of a generalized signal processor in which it is desired to sample periodic signals received at a nominal frequency f over a line 130, using a local clock source 132. The sampling frequency is assumed to be a multiple of, and derived from, the local clock frequency. There is a frequency difference or error, designated e, between the incoming signal frequency and the local clock frequency. For purposes of illustration, the received signals are assumed to be at frequency f and the local clock source 132 generating signals at a frequency (f+e). The frequency error e may be due to movement of the received signal source, a real error in the local clock source frequency, or a deliberately introduced error in the local clock source frequency. The error frequency measurement is determined in a frequency difference determination circuit 134. This may be, as in the GPS receiver case, an adder that integrates received frequency measurements at a rate derived from the local clock source 132. The circuit 134 provides an output at a frequency proportional to the error frequency e. A frequency adjustment circuit 136 compensates for the frequency error and provides a clock signal at frequency f, to be used in demodulation of the received signals. Note that f could be a carrier frequency or a modulation code signal frequency. Also included is a circuit 138 for extracting a measurement of sub-sample phase from the error frequency e derived from the frequency difference measurement circuit 134. Extracting this sub-sample phase measurement in the case of the GPS receiver made use of a simple divider. When the error measurement e is appropriately scaled, the divider provides an instantaneous measure of sub-sample phase.

Figure 17:
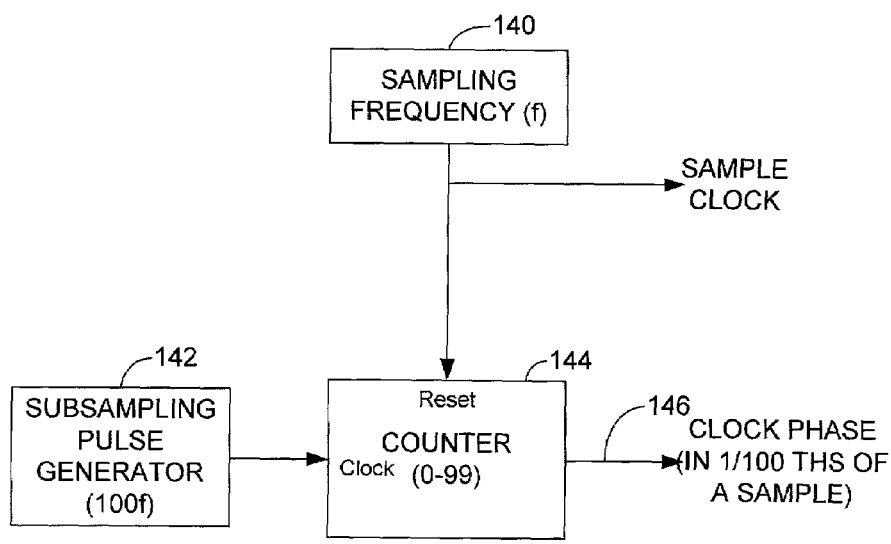
FIG. 17 is a simplified block diagram showing in general how sub-sample temporal resolution can be obtained by use of a sub-sample clock in accordance with another aspect of the invention.

FIG. 17 depicts another way to obtain a fine time scale in order to reproduce a signal or window with a desired profile. A sampling clock signal is provided from a primary clock source 140 operating at a frequency f. A sub-sampling clock source 142 operates at a multiple of the primary clock 140, such as 100f. The sub-sampling source clock 142 clocks a counter 144 that has values 0–99 and is reset by pulses from the primary clock 140. Thus, the numeric count in the counter 144 indicates a sub-sample time value in hundredths of a sample interval. In the GPS context, the sub-sample time value on line 146 from the counter 144 can be used in the same way as the code phase value transmitted over line 70 or 70' to the enhanced code window generator 28E or the enhanced code error window generator 70E.

It will be appreciated from the foregoing that the present description represents a significant advance in the field of GPS receivers and in any signal processing system in which it is desired to reproduce signals or signal windows to a level of precision that is not limited in temporal terms by the length of a signal sampling interval, and not limited to magnitudes that are multiples or sub-multiples of a received code signal. It will also be appreciated that, although specific embodiments of the invention have been described in detail for purposes of illustration, various modifications may be made without departing from the spirit and scope of the invention. Accordingly, the invention should not be limited except as by the appended claims.

What is claimed is:

1. A method for reproducing a signal of a desired profile, for use in processing digitally sampled signals in a receiver, the method comprising the steps of:
   demodulating received signals in the receiver, to derive a periodic code signal;
   generating in the receiver a local clock signal used to provide signal sampling pulses separated by sampling intervals;
   determining a frequency difference between the local clock signal and the received signals;
   adjusting the local clock signal to compensate for the frequency difference;
   deriving from the frequency difference a code phase value that provides a measure of a sub-sample code phase difference between the sampling pulses and the received signals; and
   using the sub-sample code phase difference to reproduce a desired signal that is precisely synchronized with the received signals.

2. The method as claimed in claim 1, wherein the step of using the sub-sample code phase difference includes:
   determining a signal magnitude for each of a succession of time values as determined from the occurrence of sampling pulses and the sub-sample code phase difference; and
   outputting a succession of magnitudes to provide the desired signal.

3. The method as claimed in claim 1, wherein:
   the desired signal defines a weighted time window; and
   the method further comprises the step of applying the weighted time window to the received signals, to detect a signal event expected to occur within the weighted time window.

4. The method as claimed in claim 2, wherein:
   the desired signal defines a weighted time window; and
   the method further comprises the step of applying the weighted time window to the received signals, to detect a signal event expected to occur within the weighted time window.

5. The method as claimed in claim 4, wherein the step of determining a signal magnitude for each of a succession of time values provides a time window that is weighted to optimize signal event detection for a particular communication channel through which the signals are received.

6. A method for generating a desired signal that is synchronized with respect to a signal event in a received, periodic, digitally sampled signal, the method comprising the steps of:
   generating sample clock signals at sample intervals occurring at a sampling clock rate that is nominally an integral multiple of a rate at which signal events occur in a received periodic signal, but which are not exactly synchronized with the received periodic signal;

generating sub-sample clock signals;
deriving from the sub-sample clock signals a measure of clock phase within each sample interval; and
generating the desired signal synchronized with the received signal event to an accuracy level based on the measure of clock phase derived from the sub-sample clock signals.

7. The method as claimed in claim 6, wherein the step of generating the desired signal includes:
generating a succession of signal magnitudes at times determined by the sub-sample clock signals, to provide a desired signal profile.

8. The method as claimed in claim 6, wherein the step of deriving a measure of clock phase includes the steps of:
applying the sub-sample clock signals to a counter;
resetting the counter with the sample clock signals; and
using the counter value as the measure of clock phase.

9. A method for generating a weighted signal window of a desired profile in a receiver that digitally samples received periodic signals, the method comprising the steps of:
demodulating received signals in the receiver, to derive a periodic code sequence;
generating in the receiver a local clock signal used to provide signal sampling pulses separated by sampling intervals and to generate other timing signals;
generating in the receiver a local periodic code sequence similar to the one received, at a code rate determined in part by the local clock signal and nominally the same as a received code rate;
determining in the receiver a frequency difference between the received code rate and the locally generated code rate;
applying the frequency difference to the locally generated code rate to provide an adjusted locally generated code rate;
deriving from the frequency difference a code phase value indicative of the code phase within a code rate period; and
using the code phase value to generate the weighted signal window that is synchronized with a desired signal event in the received code sequence.

10. The method as claimed in claim 9, wherein:
the step of applying the frequency difference to the locally generated code includes dividing the frequency difference by a selected value, using a counter to provide an output signal whenever the counter overflows, to indicate that the frequency difference has resulted in a cumulative phase error equivalent to a code rate period; and
the step of deriving a code phase value includes multiplying the code rate period by the ratio of the current counter contents to a counter value.

11. The method as claimed in claim 10, wherein the step of using the code phase value to generate the weighted signal window includes:
generating a succession of signal values of selected magnitudes, at times precisely determined from the code phase value, wherein the signal window is synchronized with a received signal event and has a desired profile.

12. The method as claimed in claim 11, wherein:
the desired profile of said signal window is selected to mitigate multipath effects.

13. The method as claimed in claim 11, wherein:
the desired profile of said signal window is selected for optimal detection of a signal pulse after the received signals have passed through a communication channel of limited bandwidth.

14. In a receiver that processes digitally sampled signals, an apparatus for reproducing a signal of a desired profile, the apparatus comprising:
a demodulator connected to receive signals in the receiver, and to derive a periodic code signal;
a local clock signal generator used to provide signal sampling pulses separated by sampling intervals;
a frequency differencing circuit, for determining a frequency difference between local clock signals and received signals;
means for adjusting the local clock signals to compensate for the frequency difference;
means for deriving from the frequency difference a code phase value that provides a measure of a sub-sample code phase difference between the sampling pulses and the received signals; and
a signal generator using the sub-sample code phase difference to reproduce a desired signal that is precisely synchronized with the received signals.

15. The apparatus as claimed in claim 14, wherein the signal generator using the sub-sample code phase difference includes:
means for determining a signal magnitude for each of a succession of time values as determined from the occurrence of sampling pulses and the sub-sample code phase difference; and
means for outputting a succession of magnitudes to provide the desired-signal.

16. The apparatus as claimed in claim 14, wherein:
the desired signal defines a weighted time window; and
the apparatus further comprises means for applying the weighted time window to the received signals, to detect a signal event expected to occur within the weighted time window.

17. The apparatus as claimed in claim 15, wherein:
the desired signal defines a weighted time window; and
the apparatus further comprises means for applying the weighted time window to the received signals, to detect a signal event expected to occur within the weighted time window.

18. The apparatus as claimed in claim 17, wherein the means for determining a signal magnitude for each of a succession of time values provides a time window that is weighted to optimize signal event detection for a particular communication channel through which the signals are received.

19. An apparatus for generating a desired signal that is synchronized with respect to a signal event in a received, periodic, digitally sampled signal, the apparatus comprising:
a sample clock signal generator, generating sample clock signals at sample intervals occurring at a sampling clock rate that is nominally an integral multiple of a rate at which signal events occur in a received periodic signal, but which are not exactly synchronized with the received periodic signal;
a sub-sample clock signal generator for generating sub-sample clock signals;
a unit for deriving from the sub-sample clock signals a measure of clock phase within each sample interval; and a unit for generating the desired signal synchronized with the received signal based on the measure of clock phase derived from the sub-sample clock signals.

20. The apparatus as claimed in claim 19, wherein the unit for generating the desired signal includes:
a unit for generating a succession of signal magnitudes at times determined by the sub-sample clock signals, to provide a desired signal profile.

21. The apparatus as claimed in claim 19, wherein the unit for deriving a measure of clock phase includes:
a unit for applying the sub-sample clock signals to a counter;
a unit for resetting the counter with the sample clock signals; and
a unit for using the counter value as the measure of clock phase.

22. An apparatus for generating a weighted signal window of a desired profile in a GPS receiver that digitally samples received periodic signals, the apparatus comprising:
a demodulator, for demodulating received signals in the GPS receiver, to derive a periodic GPS code sequence;
a local clock generator, for generating a local clock signal used to provide signal sampling pulses separated by sampling intervals and to provide other timing signals in the receiver;
a local periodic GPS code generator, for generating in the receiver a local periodic GPS code sequence similar to the one received, at a code rate determined in part by the local clock signal and nominally the same as a received code rate;
a circuit for determining a frequency difference between the received GPS code rate and the locally generated GPS code rate;
an adjustable divider circuit for applying the frequency difference to the locally generated GPS code rate, to provide an adjusted locally generated GPS code rate;
a counter circuit for deriving from the frequency difference a code phase value indicative of the code phase within a code rate period; and
a signal window generator that uses the code phase value as a measure of time, and generates the weighted signal window that is synchronized with a desired signal event in the received GPS code sequence.

23. The apparatus as claimed in claim 22, wherein:
the counter circuit for deriving the code phase value divides the frequency difference by a selected value and provides an output signal whenever the counter overflows, to indicate that the frequency difference has resulted in a cumulative phase error equivalent to a whole code rate period, wherein this output signal is coupled to the adjustable divider circuit; and
the apparatus further comprises a code phase generation circuit, for multiplying the code rate period by the ratio of the current counter contents to a full counter value.

24. The apparatus as claimed in claim 22, wherein the signal window generator includes:
a unit for generating a succession of signal values of selected magnitudes, at times precisely determined from the code phase value, wherein the signal window is synchronized with a received signal event and has a desired profile.

25. The apparatus as claimed in claim 24, wherein:
the signal window generator provides a desired window profile selected to mitigate multipath effects.

26. The apparatus as claimed in claim 24, wherein:
the signal window generator provides a desired window profile selected for optimal detection of a signal pulse after the received signals have passed through a communication channel of limited bandwidth.

* * * * *